(12) United States Patent
Lai et al.

(10) Patent No.: US 10,911,551 B2
(45) Date of Patent: Feb. 2, 2021

(54) METHODS AND SYSTEMS FOR PROVIDING CONTENT TO USERS OF A SOCIAL NETWORKING SERVICE

(71) Applicant: FACEBOOK, INC., Menlo Park, CA (US)

(72) Inventors: Peter Tuchen Lai, Mountain View, CA (US); Jia Lu, Fremont, CA (US); Selena Menglu Wang, San Jose, CA (US)

(73) Assignee: FACEBOOK, INC., Menlo Park, CA (US)

( * ) Notice: Subject to any disclaimer, the term of this patent is extended or adjusted under 35 U.S.C. 154(b) by 332 days.

(21) Appl. No.: 15/404,037

(22) Filed: Jan. 11, 2017

(65) Prior Publication Data

US 2018/0198847 A1    Jul. 12, 2018

(51) Int. Cl.
*H04L 29/08* (2006.01)
*G06Q 30/02* (2012.01)
*G06Q 50/00* (2012.01)

(52) U.S. Cl.
CPC ......... *H04L 67/18* (2013.01); *G06Q 30/0241* (2013.01); *G06Q 30/0251* (2013.01); *G06Q 30/0269* (2013.01); *G06Q 50/01* (2013.01); *H04L 67/22* (2013.01); *H04L 67/306* (2013.01)

(58) Field of Classification Search
CPC ....... H04L 67/18; H04L 67/22; H04L 67/306; H04L 47/12; H04L 47/127; G06Q 30/0241; G06Q 30/0251; G06Q 30/0269; G06Q 50/01

USPC ........................................................ 709/223
See application file for complete search history.

(56) References Cited

U.S. PATENT DOCUMENTS

| | | | | |
|---|---|---|---|---|
| 7,978,607 | B1 * | 7/2011 | Halabi ............... | H04L 47/30 370/229 |
| 2003/0163343 | A1 * | 8/2003 | Meiser ............... | G06Q 30/02 705/1.1 |
| 2008/0298397 | A1 * | 12/2008 | Kwan ................ | H04L 47/263 370/477 |
| 2011/0026401 | A1 * | 2/2011 | Wakuda ............. | H04L 65/608 370/235 |
| 2012/0158852 | A1 * | 6/2012 | Goldsmith ......... | G06Q 10/10 709/205 |

(Continued)

*Primary Examiner* — Thomas J Dailey
*Assistant Examiner* — Lam H Duong
(74) *Attorney, Agent, or Firm* — Morgan, Lewis & Bockius LLP

(57) ABSTRACT

An exemplary method of providing content to users of a social networking service includes determining user-traffic patterns during respective periods of time for a plurality of users on a social networking service in a geographic region. The user-traffic patterns including a first user-traffic pattern during a first period of time. The method further includes selecting a first set of users from the plurality of users in the geographic region to receive personalized content. The personalized content is personalized for respective users in the first set of users. The method further includes setting a first distribution rate for the personalized content during the first period of time based at least in part on the first user-traffic pattern and providing the personalized content to client devices of respective users in the first set of users in accordance with the first distribution rate during the first period of time.

20 Claims, 12 Drawing Sheets

(56) References Cited

U.S. PATENT DOCUMENTS

| | | | | |
|---|---|---|---|---|
| 2014/0074712 A1* | 3/2014 | Palmer | ............... | G06Q 20/1235 |
| | | | | 705/44 |
| 2014/0287730 A1* | 9/2014 | Masuda | ................ | H04W 24/02 |
| | | | | 455/414.3 |
| 2015/0025977 A1* | 1/2015 | Doyle | ................ | G06Q 30/0269 |
| | | | | 705/14.66 |
| 2015/0134724 A1* | 5/2015 | Hao | .................... | H04L 65/1069 |
| | | | | 709/203 |
| 2015/0288997 A1* | 10/2015 | Basra | ................ | H04N 21/2358 |
| | | | | 725/9 |
| 2016/0042407 A1* | 2/2016 | Els | .................... | G06Q 30/0275 |
| | | | | 705/14.71 |
| 2016/0164888 A1* | 6/2016 | Chang | ................ | H04L 67/1097 |
| | | | | 726/22 |
| 2016/0295429 A1* | 10/2016 | Enqvist | .................. | H04W 4/18 |
| 2017/0330292 A1* | 11/2017 | Lancar | ............... | G06Q 30/0269 |

* cited by examiner

774

METHODS AND SYSTEMS FOR PROVIDING CONTENT TO USERS OF A SOCIAL NETWORKING SERVICE

TECHNICAL FIELD

This relates generally to providing content, including but not limited to providing personalized content to users of a social networking service.

BACKGROUND

Social networking services provide a convenient means for users of the social networking service to share information (e.g., posting an image). Social networking services may, on occasion, provide content to their users. Providing the content, however, can be a resource-intensive process for the social networking services and for related networks.

SUMMARY

Accordingly, there is a need for methods and systems for providing the content (e.g., providing personalized content for users of a social networking service) that uses resources in an efficient manner. Determining user-traffic patterns of users of the social networking service and providing the content in accordance with the determined user-traffic patterns can improve usage of network resources. Such methods and systems provide the social networking services with processes to set distribution rates for the content using the determined user-traffic patterns.

In accordance with some embodiments, a method is performed at a server system having processors and memory storing instructions for execution by the processors. The method includes determining user-traffic patterns during respective periods of time for a plurality of users on a social networking service in a geographic region. The user-traffic patterns include a first user-traffic pattern during a first period of time. The method further includes selecting a first set of users from the plurality of users in the geographic region to receive personalized content. The personalized content is personalized for respective users in the first set of users. The method further includes setting a first distribution rate for the personalized content during the first period of time based at least in part on the first user-traffic pattern and providing the personalized content to client devices of respective users in the first set of users in accordance with the first distribution rate during the first period of time.

In accordance with some embodiments, a server system includes one or more processors/cores, memory, and one or more programs; the one or more programs are stored in the memory and configured to be executed by the one or more processors/cores and the one or more programs include instructions for performing the operations of the method described above. In accordance with some embodiments, a computer-readable storage medium has stored therein instructions that when executed by one or more processors/cores of a server system cause the server system to perform the operations of the method described.

BRIEF DESCRIPTION OF THE DRAWINGS

For a better understanding of the various described embodiments, reference should be made to the Description of Embodiments below, in conjunction with the following drawings in which like reference numerals refer to corresponding parts throughout the figures.

DESCRIPTION OF EMBODIMENTS

Reference will now be made to embodiments, examples of which are illustrated in the accompanying drawings. In the following description, numerous specific details are set forth in order to provide an understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

It will also be understood that, although the terms first, second, etc. are, in some instances, used herein to describe various elements, these elements should not be limited by these terms. These terms are used only to distinguish one element from another. For example, a first set of users could be termed a second set of users, and, similarly, a second set of users could be termed a first set of users, without departing from the scope of the various described embodiments. The first set of users and the second set of users are both users of a social networking service, but they are not the same users.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting" or "in accordance with a determination that," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]" or "in accordance with a determination that [a stated condition or event] is detected," depending on the context.

As used herein, the term "exemplary" is used in the sense of "serving as an example, instance, or illustration" and not in the sense of "representing the best of its kind."

Figure 1:
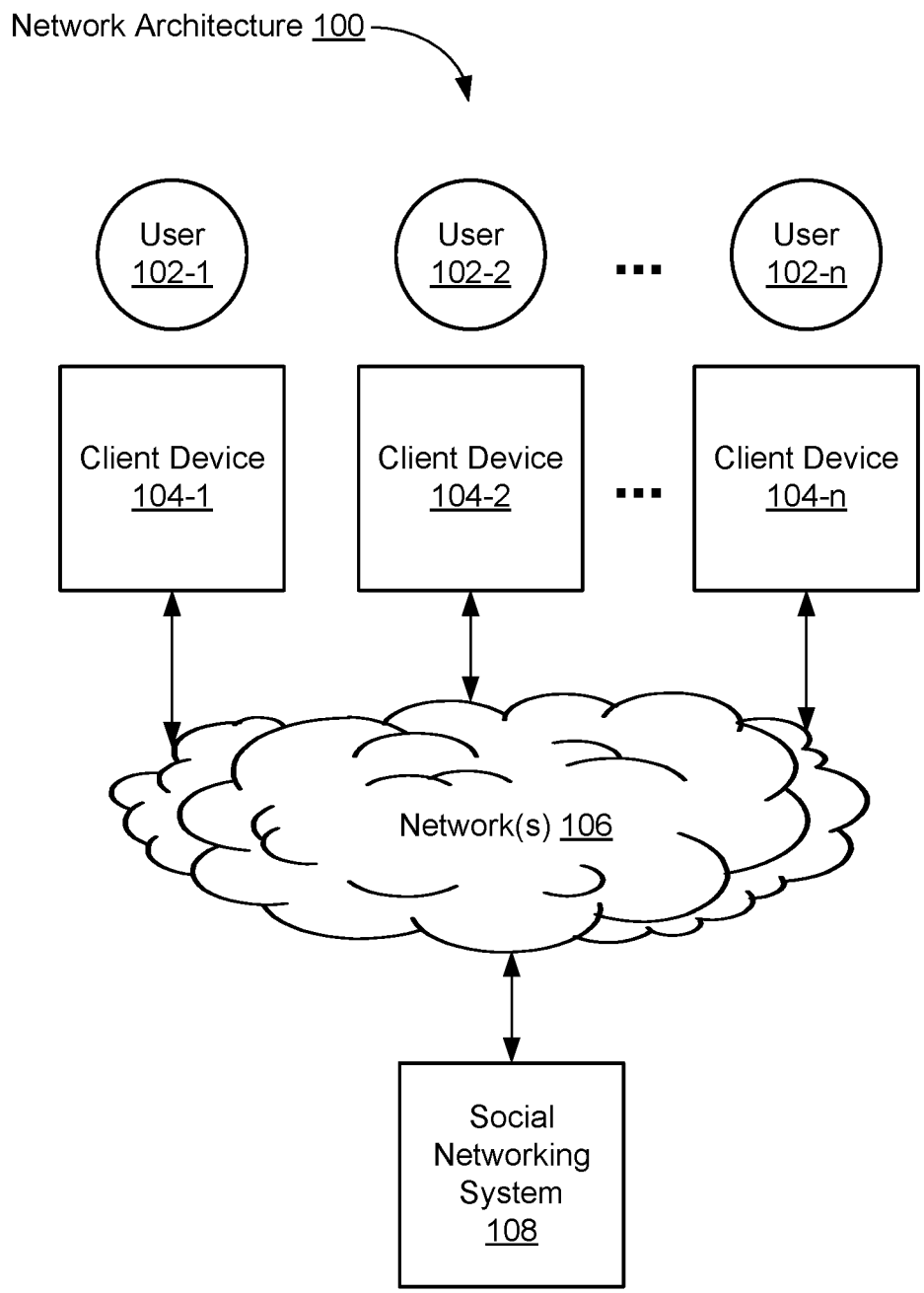
FIG. 1 is a block diagram illustrating an exemplary network architecture of a social network in accordance with some embodiments.

FIG. 1 is a block diagram illustrating an exemplary network architecture of a social network in accordance with some embodiments. The network architecture 100 includes a number of client devices (also called "client systems," "client computers," or "clients") 104-1, 104-2, . . . 104-n communicably connected to a social networking system 108 by one or more networks 106.

In some embodiments, the client devices 104-1, 104-2, . . . 104-n are computing devices such as smart watches, personal digital assistants, portable media players, smart phones, tablet computers, 2D gaming devices, 3D gaming devices, virtual reality devices, laptop computers, desktop computers, televisions with one or more processors embedded therein or coupled thereto, in-vehicle information systems (e.g., an in-car computer system that provides navigation, entertainment, and/or other information), or other appropriate computing devices that can be used to communicate with an electronic social networking system and other computing devices (e.g., via the electronic social networking system). In some embodiments, the social networking system 108 is a single computing device such as a computer server, while in other embodiments, the social networking system 108 is implemented by multiple computing devices working together to perform the actions of a server system (e.g., cloud computing). In some embodiments, the network 106 is a public communication network (e.g., the Internet or a cellular data network), a private communications network (e.g., private LAN or leased lines), or a combination of such communication networks.

Users 102-1, 102-2, . . . 102-n employ the client devices 104-1, 104-2, . . . 104-n to access the social networking system 108 and to participate in a social networking service. For example, one or more of the client devices 104-1, 104-2, . . . 104-n execute web browser applications that can be used to access the social networking service. As another example, one or more of the client devices 104-1, 104-2, . . . 104-n execute software applications that are specific to the one or more social networks (e.g., social networking "apps" running on smart phones or tablets, such as a Facebook social networking application, a messaging application, etc., running on an iPhone, Android, or Windows smart phone or tablet).

Users interacting with the client devices 104-1, 104-2, . . . 104-n can participate in the social networking service provided by the social networking system 108 by providing and/or consuming (e.g., posting, writing, viewing, publishing, broadcasting, promoting, recommending, sharing) information, such as text comments (e.g., statuses, updates, announcements, replies, location "check-ins," private/group messages), digital content (e.g., photos (i.e., images), videos, audio files, links, documents), and/or other electronic content. In some embodiments, users provide information to a page, group, message board, feed, and/or user profile of a social networking service provided by the social networking system 108. Users of the social networking service can also annotate information posted by other users of the social networking service (e.g., endorsing or "liking" a posting of another user, commenting on a posting by another user, or sharing a posting of another user).

In some embodiments, information can be posted on a user's behalf by systems and/or services external to the social network or the social networking system 108. For example, the user may post a review of a movie to a movie review website, and with proper permissions that website may cross-post the review to the social network on the user's behalf. In another example, a software application executing on a mobile client device, with proper permissions, may use a global navigation satellite system (GNSS) (e.g., global positioning system (GPS), GLONASS, etc.) or other geo-location capabilities (e.g., Wi-Fi or hybrid positioning systems) to determine the user's location and update the social network with the user's location (e.g., "At Home," "At Work," "In San Francisco, Calif.," etc.), and/or update the social network with information derived from and/or based on the user's location. Users interacting with the client devices 104-1, 104-2, . . . 104-n can also use the social network provided by the social networking system 108 to define groups of users. Users interacting with the client devices 104-1, 104-2, . . . 104-n can also use the social network provided by the social networking system 108 to communicate (e.g., using a messaging application or built-in feature) and collaborate with each other.

In some embodiments, the network architecture 100 may also include third-party servers (not shown). In some embodiments, third-party servers are associated with third-party service providers that provide services and/or features to users of a network.

Figure 2:
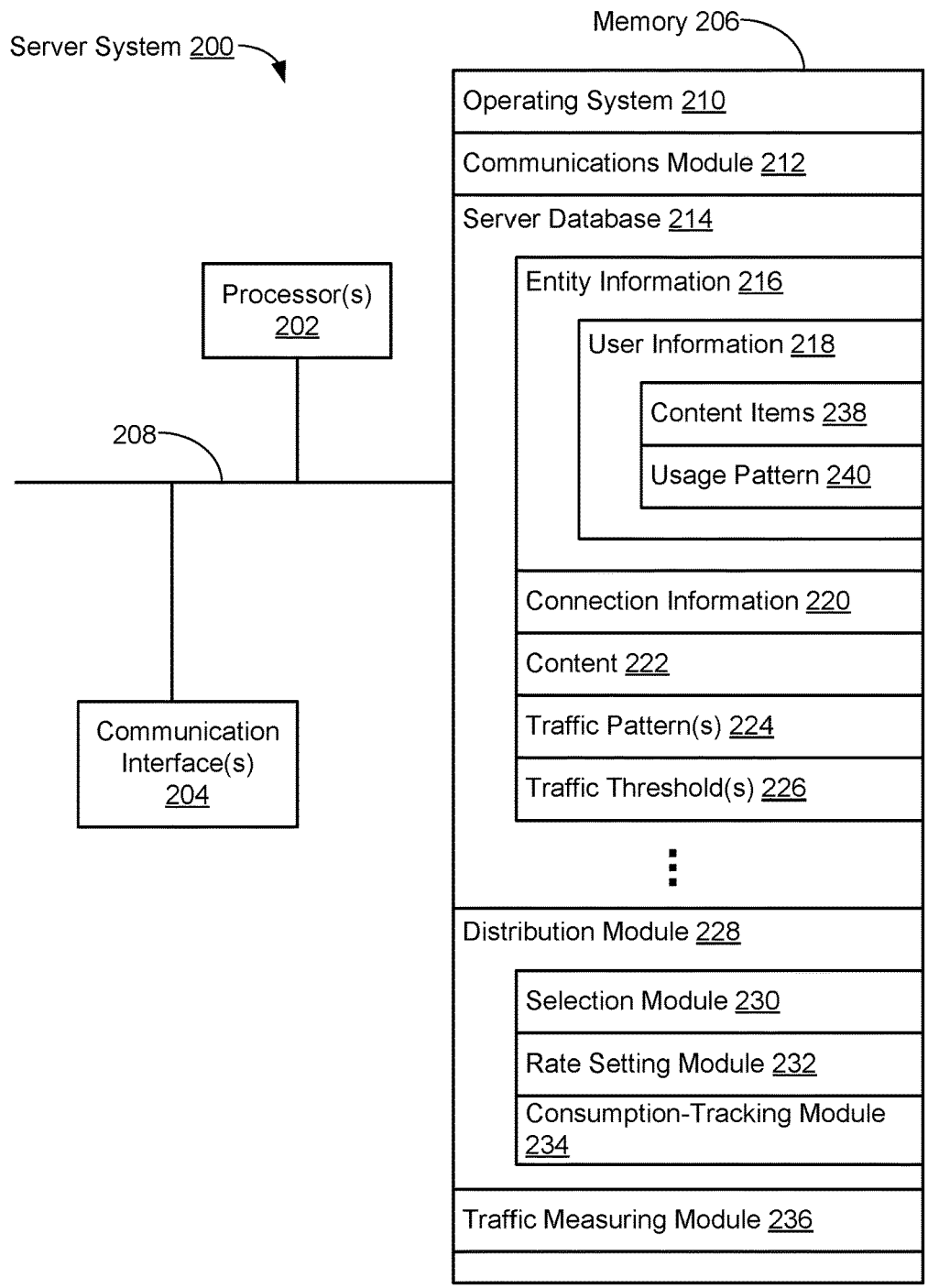
FIG. 2 is a block diagram illustrating an exemplary server system in accordance with some embodiments.

FIG. 2 is a block diagram illustrating an exemplary server system 200 in accordance with some embodiments. In some embodiments, the server system 200 is an example of a social networking system 108. The server system 200 typically includes one or more processing units (processors or cores) 202, one or more network or other communications interfaces 204, memory 206, and one or more communication buses 208 for interconnecting these components. The communication buses 208 optionally include circuitry (sometimes called a chipset) that interconnects and controls communications between system components. The server system 200 optionally includes a user interface (not shown). The user interface, if provided, may include a display device and optionally includes inputs such as a keyboard, mouse, trackpad, and/or input buttons. Alternatively or in addition, the display device includes a touch-sensitive surface, in which case the display is a touch-sensitive display.

Memory 206 includes high-speed random access memory, such as DRAM, SRAM, DDR RAM, or other random access solid state memory devices; and may include non-volatile memory, such as one or more magnetic disk storage devices, optical disk storage devices, flash memory devices, or other non-volatile solid state storage devices. Memory 206 may optionally include one or more storage devices remotely located from the processor(s) 202. Memory 206, or alternately the non-volatile memory device(s) within memory 206, includes a non-transitory computer readable storage medium. In some embodiments, memory 206 or the computer readable storage medium of memory 206 stores the following programs, modules, and data structures, or a subset or superset thereof:

an operating system 210 that includes procedures for handling various basic system services and for performing hardware dependent tasks;

a network communication module 212 that is used for connecting server system 200 (e.g., social networking system 108, FIG. 1) to other computers (e.g., client devices 104-1, 104-2, . . . 104-n, and/or third party servers) via the one or more communication network interfaces 204 (wired or wireless) and one or more communication networks, such as the Internet, cellular telephone networks, mobile data networks, other wide area networks, local area networks, metropolitan area networks, and so on;

a server database 214 for storing data associated with the social networking service, such as:

entity information 216, such as user information 218, which includes content items 238 (e.g., images, videos, etc.) and one or more usage patterns of the user 240 (e.g., traffic pattern(s) of the user);

one or more traffic patterns 224 (e.g., determined traffic patterns of users of a social networking service); and one or more traffic thresholds 226;

a distribution module 228 for distributing personalized content to users of the social networking service, which includes:

a selection module 230 for selecting content items to include in personalized content;

a rate setting module 232 for setting distribution rates for the personalized content (e.g., rates at which personalized content is distributed to the users (e.g., a set of users) of the social networking service); and a consumption-tracking module 234 for tracking posting and/or sharing of personalized content provided to the users of the social networking service; and a traffic measuring module 236 for measuring user traffic (also referred to herein as measuring data usage) by users of the social networking service.

The server database 214 stores data associated with the server system 200 in one or more types of databases, such as text, graph, dimensional, flat, hierarchical, network, object-oriented, relational, and/or XML databases.

In some embodiments, the server database 214 includes a graph database, with entity information 216 represented as nodes in the graph database and connection information 220 represented as edges in the graph database. The graph database includes a plurality of nodes, as well as a plurality of edges that define connections between corresponding nodes. In some embodiments, the nodes and/or edges themselves are data objects that include the identifiers, attributes, and information for their corresponding entities, some of which are rendered at clients 104 on corresponding profile pages or other pages in the social networking service. In some embodiments, the nodes also include pointers or references to other objects, data structures, or resources for use in rendering content in conjunction with the rendering of the pages corresponding to the respective nodes at clients 104.

Entity information 216 includes user information 218, such as user profiles, user profile pictures, other pictures associated with the user (e.g., images where the user has been tagged or identified by image analysis software), a plurality of icons, login information, payment credentials (e.g., credit-card or debit-card information, bank information, etc. for conducting financial transactions through the social networking service), privacy and other preferences, biographical data, and the like. In some embodiments, for a given user, the user information 218 includes the user's name, profile picture, a plurality of icons, contact information, birth date, sex, marital status, family status, employment, education background, preferences, interests, and/or other demographic information. In some embodiments, the user information may include other information, such as likes and comments, associated with say, profile pictures of the user (or other photos of the user).

In some embodiments, entity information 216 includes information about a physical location (e.g., a restaurant, theater, landmark, city, state, or country), real or intellectual property (e.g., a sculpture, painting, movie, game, song, idea/concept, photograph, or written work), a business, a group of people, and/or a group of businesses. In some embodiments, entity information 216 includes information about a resource, such as an audio file, a video file, a digital photo, a text file, a structured document (e.g., web page), or an application. For example, entity information 216 may include a location tag (e.g., Lake Tahoe, Calif., USA) for one or more digital photos. In some embodiments, the resource is located in the social networking system 108 (e.g., in content 222) or on an external server, such as a third-party server (not shown).

In some embodiments, connection information 220 includes information about the relationships between entities in server database 214. In some embodiments, connection information 220 includes information about edges that connect pairs of nodes in a graph database. In some embodiments, an edge connecting a pair of nodes represents a relationship between the pair of nodes (e.g., also referred to herein as a contact).

In some embodiments, an edge includes or represents one or more data objects or attributes that correspond to the relationship between a pair of nodes. For example, when a first user indicates that a second user is a "friend" of the first user, the social networking system 108 may transmit a "friend request" to the second user. If the second user confirms the "friend request," the social networking system 108 may create and store an edge connecting the first user's user node and the second user's user node in a graph database as connection information 220 that indicates that the first user and the second user are friends. In some embodiments, connection information 220 represents a friendship, a family relationship, a business or employment relationship, a fan relationship, a follower relationship, a visitor relationship, a subscriber relationship, a superior/subordinate relationship, a reciprocal relationship, a non-reciprocal relationship, another suitable type of relationship, or two or more such relationships.

In some embodiments, an edge between a user node and another entity node represents connection information 220 about a particular action or activity performed by a user of the user node towards the other entity node. For example, a user may "like" or have "attended," "played," "listened," "cooked," "worked at," "watched," etc. the entity at the other node. The page in the social networking service that corresponds to the entity at the other node may include, for example, a selectable "like," "check in," "add to favorites," etc. icon (e.g., an affordance). After the user clicks one of these icons, the social networking system 108 may create a "like" edge, "check in" edge, a "favorites" edge, etc. in response to the corresponding user action. As another example, the user may listen to a particular song using a particular application (e.g., an online music application). In this case, the social networking system 108 may create a "listened" edge and a "used" edge between the user node that corresponds to the user and the entity nodes that correspond to the song and the application, respectively, to indicate that the user listened to the song and used the application. In addition, the social networking system 108 may create a "played" edge between the entity nodes that correspond to the song and the application to indicate that the particular song was played by the particular application.

In some embodiments, content 222 includes text (e.g., ASCII, SGML, HTML), images (e.g., jpeg, tif and gif), graphics (e.g., vector-based or bitmap), audio, video (e.g., mpeg), other multimedia, and/or combinations thereof. In some embodiments, content 222 includes executable code (e.g., script for API calls), podcasts, links, and the like.

In some embodiments, the one or more traffic thresholds 226 apply to one or more regions. For example, the server system 200 may set similar (if not the same) thresholds for two regions (e.g., Middle East and Europe). In some embodiments, the one or more of traffic thresholds 226 include multiple sets of thresholds. For example, a first set of traffic thresholds may apply to a first region (e.g., North America), a second set of traffic thresholds may apply to a second region (e.g., Africa), and so on.

Figure 3:
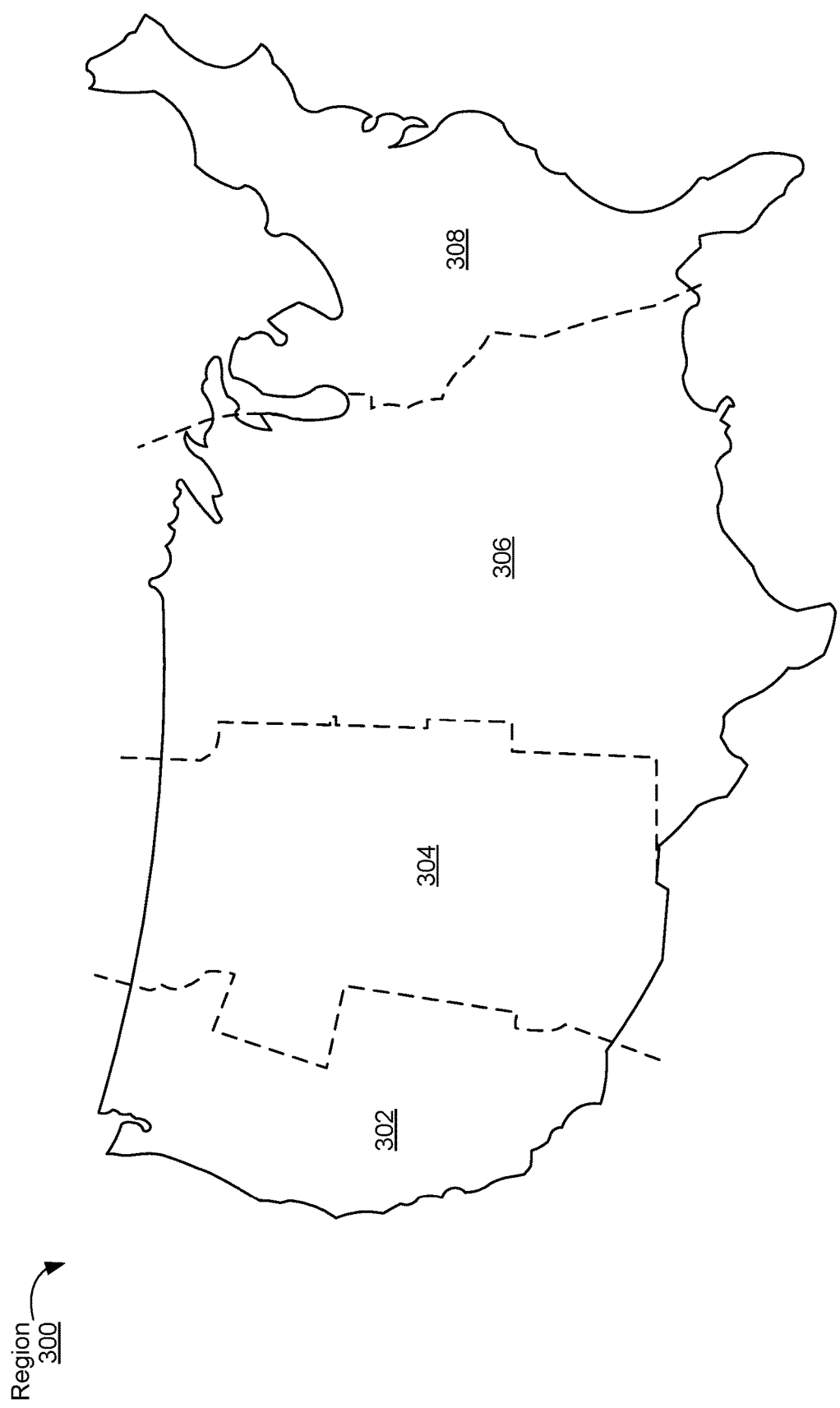
FIG. 3 illustrates a first region 300 that includes a plurality of sub-regions.

FIG. 3 illustrates a first region 300 that includes a plurality of sub-regions (e.g., sub-regions 302, 304, 306, and 308). FIG. 3 is included to assist with describing of FIGS. 5A-5B and FIGS. 6A-6B, as well as methods discussed with reference to FIGS. 7A-7F.

Figure 4:
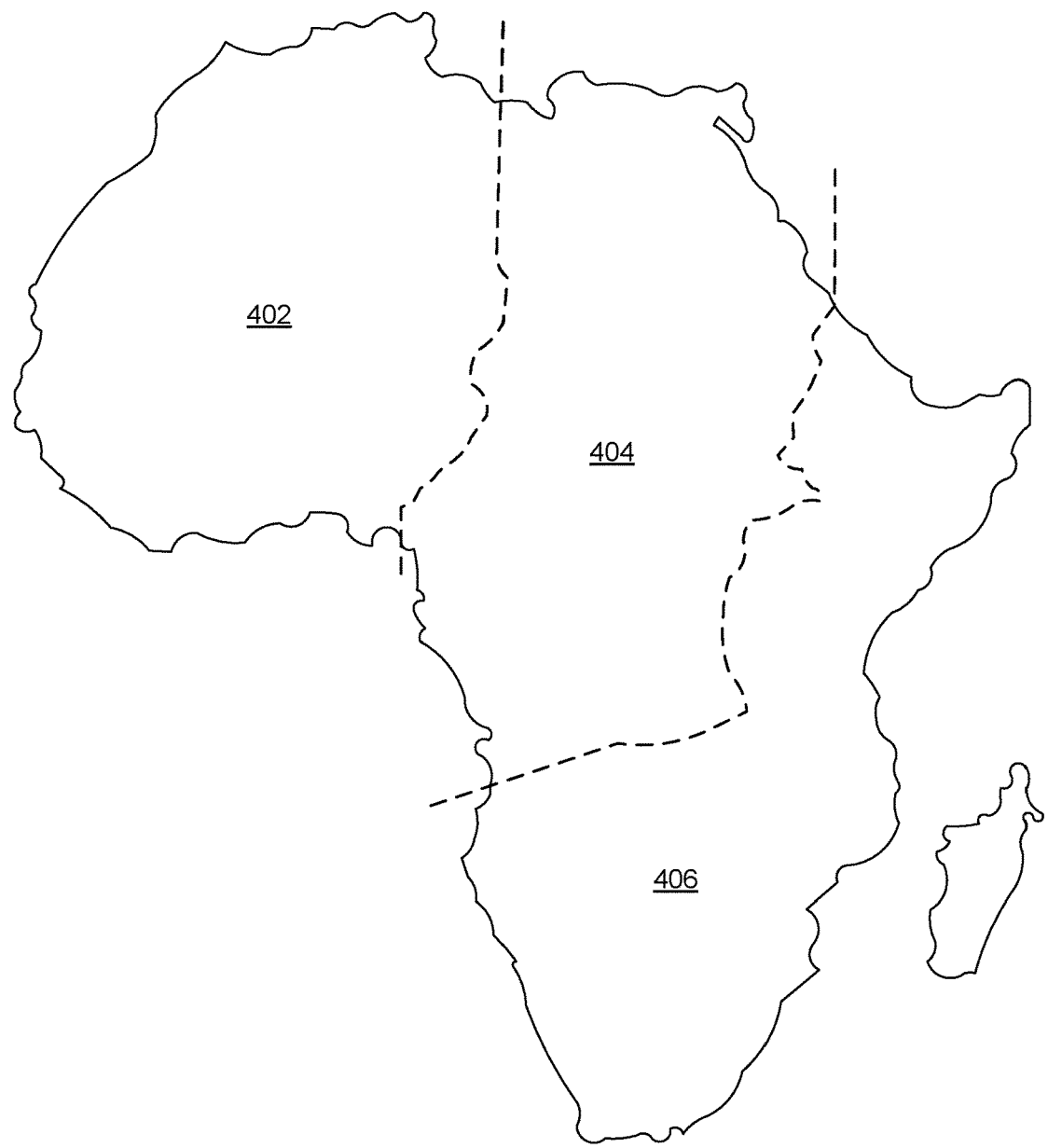
FIG. 4 illustrates a second region 400 that includes a plurality of sub-regions.

FIG. 4 illustrates a second region 400 that includes a plurality of sub-regions (e.g., sub-regions 402, 404, and 406). FIG. 4 is included to assist with describing of FIGS. 5A-5B and FIGS. 6A-6B, as well as methods discussed with reference to FIGS. 7A-7F.

A social networking system (e.g., social networking system 108, FIG. 1; server system 200, FIG. 2) may generate and provide (e.g., distribute) content to client devices. The client devices (e.g., client devices 104-1, 104-2, ... 104-n, FIG. 1) of users (e.g., users 102-1, 102-2, ... 102-n, FIG. 1) may receive and display the content. The users, after logging into the social networking service, may receive respective messages to view the content (e.g., content personalized for respective users (e.g., each user) of the social networking service). The social networking system may distribute the content to the respective users in one or more parts depending on the number of users receiving the content. Distribution of the content is a resource-intensive process for the social networking system. Consequently, the social networking system may distribute the content in such a manner that accounts for allocated system resources. In some embodiments, the social networking system may account for allocated system resources as the resources change in real time. In some embodiments, a first region (e.g., region 300) may have a greater data capacity relative to a data capacity of a second region (e.g., region 400).

Figure 5A:
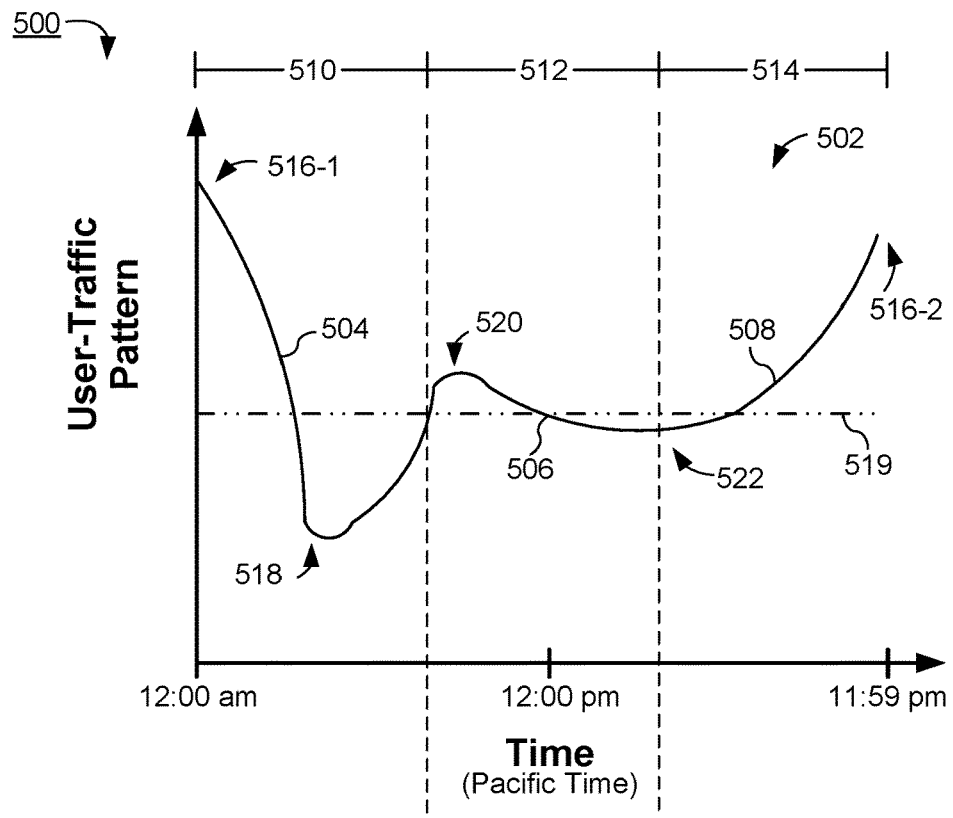
FIG. 5A is a prophetic diagram of a user-traffic pattern in a geographic region over a period of time, in accordance with some embodiments.

FIG. 5A is a prophetic diagram of a user-traffic pattern in a geographic region over a period of time, in accordance with some embodiments. The prophetic diagram 500 includes a user-traffic pattern 502 of users of the social networking service in a geographic region over the period of time. In some embodiments, the user-traffic pattern 502 includes a first user-traffic pattern 504, a second user-traffic pattern 506, and a third user-traffic pattern 508. The first, second, and third user-traffic patterns are merely illustrative examples and one skilled in the art will appreciate that numerous user-traffic patterns may be included in the user-traffic pattern 502.

In some embodiments, the geographic region may be a region such as Africa, North America, Latin America (LATAM), Asian Pacific (APAC), and the like. In some embodiments, the geographic region is a sub-region of the region (e.g., sub-regions 302, 304, 306, and/or 308 of region 300, FIG. 3; sub-regions 402, 404, and/or 406 of region 400, FIG. 4). In some embodiments, the social networking system may define one or more sub-regions of a respective region by time zones of the respective region. For example, the continental United States includes four time zones: Pacific (PT); Mountain (MT); Central (CT); and Eastern (ET) zones. Accordingly, the sub-regions 302, 304, 306, and 308 may be defined in accordance with these time zones. In some embodiments, the social networking system defines one or more sub-regions of a respective region by grouping one or more areas (e.g., countries, states, provinces, etc.). For example, the social networking system may divide Africa 400 into a western sub-region 402, a central sub-region 404, and an eastern sub-region 406. The western sub-region 402 may include a first plurality of countries, the central sub-region 404 may include a second plurality of countries, and the eastern sub-region 406 may include a third plurality of countries. In some embodiments, when defining the sub-regions for the region, the social networking system may account for datacenters that serve the region. Accordingly, the social networking system may define one or more sub-regions of a respective region in accordance with the datacenters in the respective region (and/or in accordance with datacenters in the one or more sub-regions).

The user-traffic pattern 502 may be measured over (e.g., during) a period of time in the geographic region. In some embodiments, the period of time may be a twenty-four hour period (e.g., a day of the year). For example, the prophetic diagram 500 illustrates 12:00 am to 11:59 pm PT. In some embodiments, the period of time may be another hourly period (e.g., a forty-eight hour period). In some embodiments, the period of time may include a first period of time 510 (e.g., 12:00 am to 7:59 am), a second period of time 512 (e.g., 8:00 am to 3:59 pm), and a third period of time 514 (e.g., 4:00 pm to 11:59 pm). In some embodiments, the first period of time 510 includes the first user-traffic pattern 504, the second period of time 512 includes the second user-traffic pattern 506, and so on. The first, second, and third periods of time provided are merely illustrative examples and one skilled in the art will appreciate that numerous periods of time having various durations may be included in the period of time.

In some embodiments, the social networking system may determine the user-traffic pattern 502 by determining an average usage pattern on the social networking service. For example, the social networking system may determine user-traffic patterns for a statistically significant number of users on one or more associated days. In some embodiments, the one or more associated days may be days where user traffic is substantially similar. For example, the social networking system may measure user traffic on each Monday in March. In some embodiments, the user-traffic pattern 502 may be used to estimate user traffic at a future period of time. For example, the social networking system may use the user-traffic pattern 502 to estimate user traffic on each Monday in March, 2016 (or user traffic on another Monday of the year).

In some embodiments, the social networking system may flag one or more days having user traffic that may deviate from an anticipated user-traffic pattern. For example, the social networking system may flag, say, President's day, which falls on a Monday in February because user traffic on President's day may differ from a user-traffic pattern associated with a non-holiday Monday in February.

The user-traffic pattern 502 may include one or more peak regions (e.g., peak regions 516-1 and 516-2). The one or more peak regions may be associated with heavier than normal (e.g., average) user traffic on the social networking service. For example, peak regions 516-1 and 516-2 demonstrate that user traffic substantially increases in the evening relative to an average user traffic 519 (e.g., after users leave work, school, etc.). The user-traffic pattern 502 may include one or more valley regions (e.g., valley region 518). The one or more valley regions may be associated with lighter than normal (e.g., average) user traffic on the social networking service. For example, the valley region 518 may demonstrate that user traffic substantially decreases during the early morning relative to the average user traffic 519 (e.g., when users are sleeping). Other regions are associated with moderate user traffic on the social networking service. For example, peak 520 demonstrates that user traffic increases, relative to the average 519, during a period of time in the morning (e.g., users logging into the social networking service prior to work, school, etc.). For another example, region 522 demonstrates that user traffic is substantially average during midday (e.g., a majority of users may be at work, school, etc.).

Figure 5B:
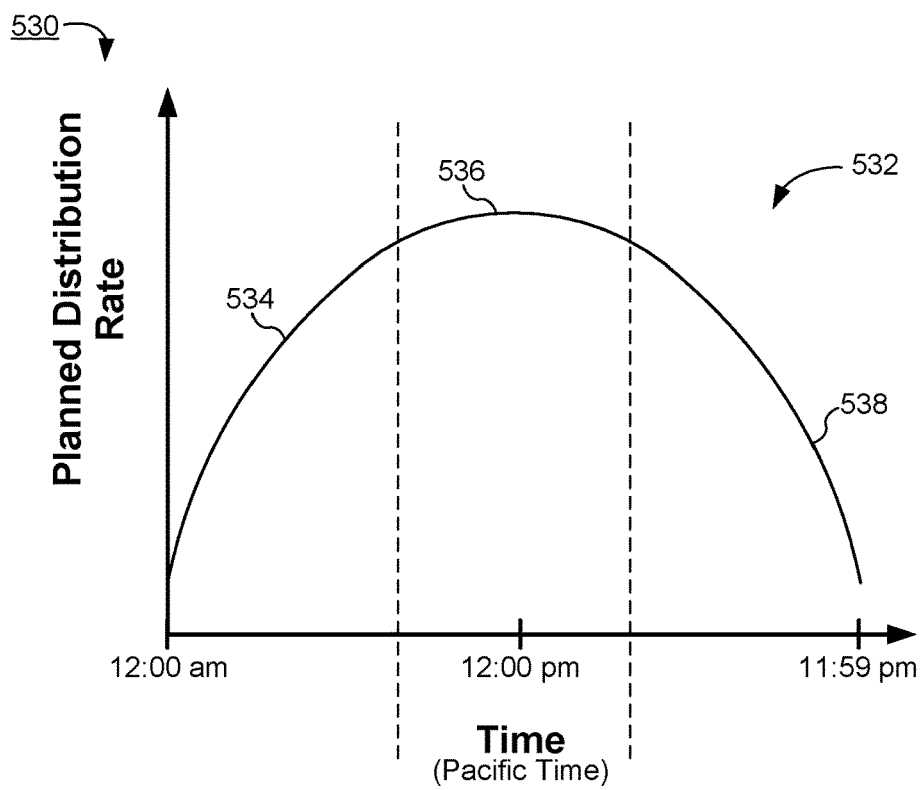
FIG. 5B is a prophetic diagram of a planned distribution rate of personalized content to users of a social networking system in a geographic region over a period of time, in accordance with some embodiments.

FIG. 5B is a prophetic diagram 530 of a planned distribution rate 532 of content in the geographic region during the period of time, in accordance with some embodiments. In some embodiments, the social networking system may distribute content to respective users of the social networking service at a rate (e.g., distribute a number of personalized videos over an hour). For example, if the user-traffic pattern 502 is used to estimate user traffic on a respective day of the year (e.g., President's Day), then the social networking system may set the planned distribution rate 532 for the respective day based on the user-traffic pattern 502. In this way, the social networking system may minimize a risk of exceeding server and/or network data capacity when distributing content (e.g., the social networking system may predict when user traffic will be highest (e.g., peak regions 516-1 and 516-2) and may limit content distribution during those peak hours).

In some embodiments, the distribution rate 532 may include one or more sub-rates. For example, the planned distribution rate 532 includes a first distribution rate 534, a second distribution rate 536, and a third distribution rate 538. In some embodiments, the social networking system may set the one or more sub-rates in accordance with the user-traffic pattern 502 (or more precisely, in accordance with the first 504, second 506, and third 508 user-traffic patterns, respectively). For example, the social networking system may set the first distribution rate 534 to create an inverse relationship between the first user-traffic pattern 504 and the first distribution rate 534. In some embodiments, setting the one or more sub-rates in accordance with the user-traffic pattern(s) includes increasing the one or more sub-rates at a rate that is inversely proportional to a rate of decrease in the user-traffic pattern 502 over a period of time (or vice versa). For example, the first user-traffic pattern 504 decreases from peak region 516-1 to valley region 518 over the first period of time 510 (FIG. 5A). The first distribution rate 534 may increase at a substantially proportional rate during the first period of time 510. In this way, the social networking system may evenly distribute system resources over the first period of time 510. In another example, the third user-traffic pattern 508 increases at a rate from region 522 to peak 516-2 over the second period of time 514 (FIG. 5A). The third sub-distribution rate 538 may decrease at a substantially proportional rate during the second period of time 514. In some embodiments, the inverse relationship may not be proportional (e.g., a respective sub-rate of the one or more sub-rates 534 may be weighted).

In addition to the user-traffic pattern 502, the social networking system may set the planned distribution rate 532 based at least in part on a size criterion of the content being distributed. In some embodiments, in accordance with a determination that a size of the content being distributed satisfies the size criterion, the social networking system may adjust the distribution rate 532 in accordance with the size of the content. For example, the social networking system may decrease (e.g., reduce) a respective sub-rate of the one or more sub-rates to compensate for an increased size of the content being distributed.

In addition, the social networking system may set the planned distribution rate 532 based at least in part on a server and/or network data capacity in a region (e.g., region 300 or region 400). In some embodiments, the social networking system may set the planned distribution rate 532 at an increased rate (e.g., increased from a rate set in accordance with the user-traffic pattern 502) in accordance with a determination that a server and/or network data capacity for a region (e.g., region 300 or sub-region 302) meets and/or exceeds normal user traffic on the social networking service by a first threshold amount. In other words, the server(s) and/or the network(s) in the region can process substantial additional data usage on top of the normal user traffic on the social networking service. Normal usage traffic is the day-to-day data usage on the social networking service by its users.

In some embodiments, the social networking system may set the planned distribution rate 532 at a decreased rate (e.g., decreased from the rate set in accordance with the user-traffic pattern 502) in accordance with a determination that a server and/or network data capacity for a region does not meet and/or exceed normal user traffic on the social networking service by a second threshold amount. The second threshold amount is less than the first threshold amount. In other words, the server(s) and/or the network(s) in the region can process minimal additional data usage on top of the normal user traffic on the social networking service.

Figure 6A:
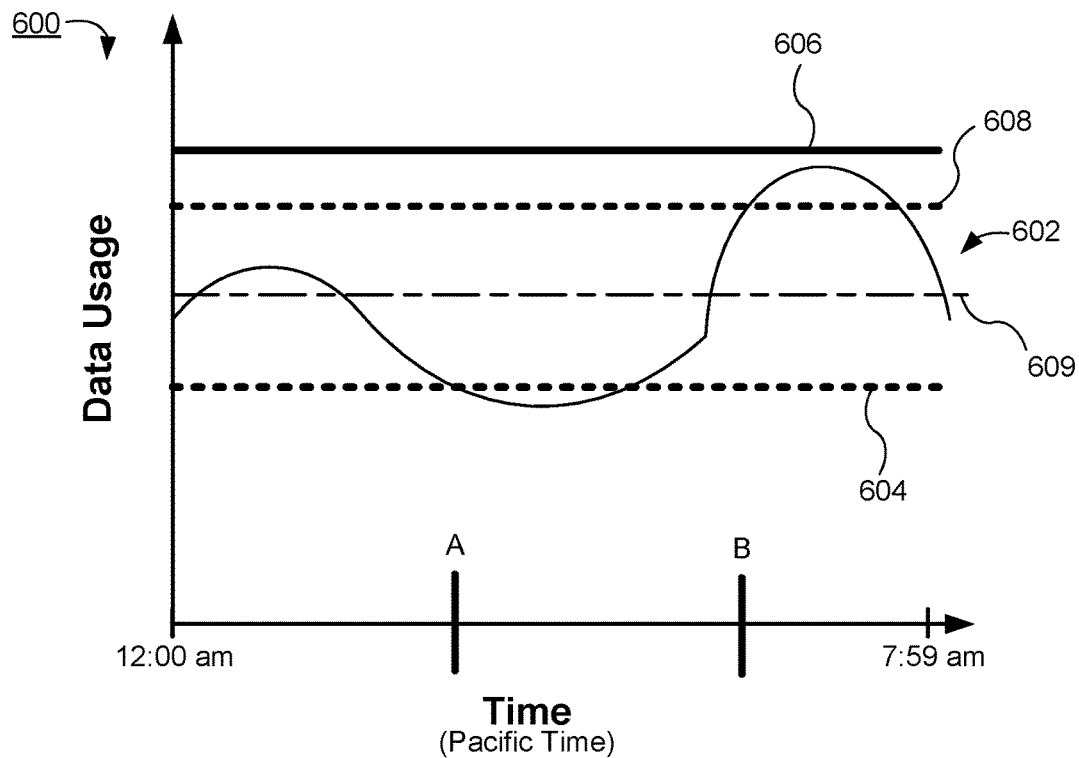
FIG. 6A is a prophetic diagram of data usage in a first geographic region over a period of time, in accordance with some embodiments.

FIG. 6A is a prophetic diagram of data usage 600 in a first geographic region over a first period of time, in accordance with some embodiments. The prophetic diagram of data usage 600 includes measured data usage 602 over the first period of time (e.g., 12:00 am to 7:59 am PT). In some embodiments, the first geographic region is a region (e.g., North America). In some embodiments, the first geographic is a sub-region of a region (e.g., sub-regions 302, 304, 306, and/or 308 of region 300, FIG. 4; sub-regions 402, 404, and/or 406 of region 400, FIG. 4). For ease of illustration, the first period of time is an eight-hour period during a day and the geographic region is the first sub-region 302, FIG. 3.

Figure 6B:
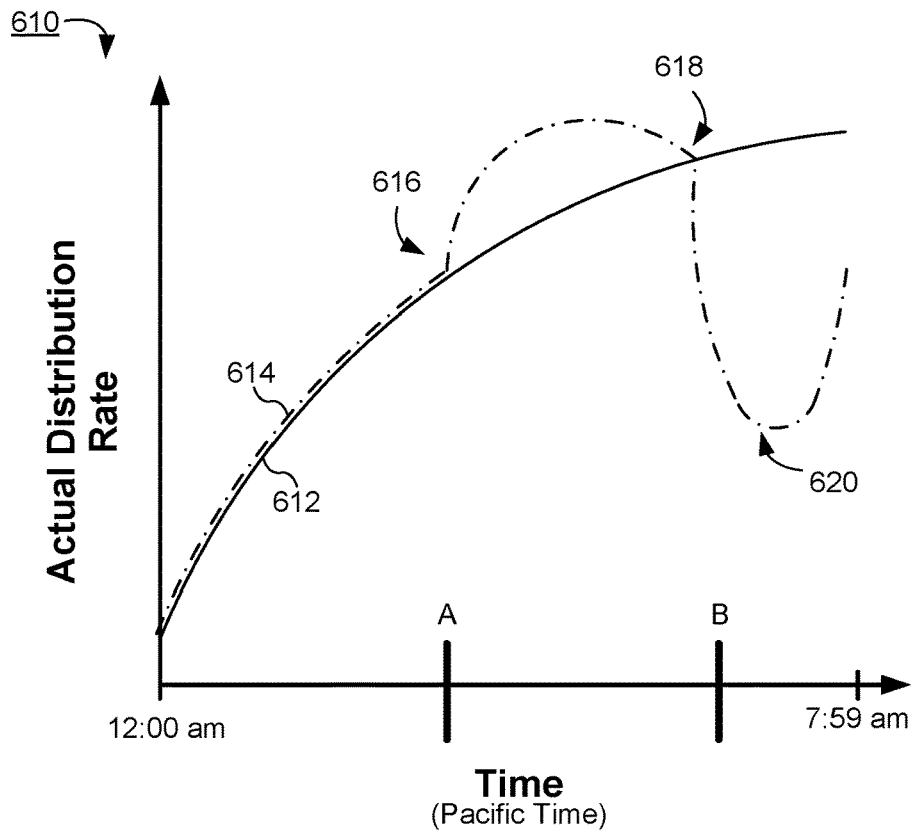
FIG. 6B is a prophetic diagram of an actual distribution rate of personalized content in a geographic region over a first period of time, in accordance with some embodiments.

FIG. 6B is a prophetic diagram of an actual distribution rate 610 of personalized content in the geographic region over the first period of time. The prophetic diagram includes a planned distribution rate 612 (solid line) and an actual distribution rate 614 (dotted line). The planned distribution rate 612 may be an example of the first distribution rate 534 of the planned distribution rate 532 (FIG. 5B). The actual distribution rate 614 is associated with the measured data usage 602 (e.g., the social networking system may modify the distribute rate 614 in real time using the measured data usage 602). The actual distribution rate 614 substantially follows the planned distribution rate 612 during a first portion of the first period of time (the actual distribution rate 614 is slightly offset for illustrative purposes). FIGS. 6A-6B are discussed together to illustrate the relationship between the measured data usage 602 and the actual distribution rate

614 when the social networking system distributes the personalized content to users of the social networking service.

In some embodiments, the measured data usage 602 includes data usage associated with the social networking system providing personalized content to a set of users of the social networking service. For example, each instance of personalized content provided to a respective user of the set of users consumes (e.g., uses) an amount of data. In addition, the measured data usage 602 may include data usage that is not associated with the providing of the personalized content (e.g., day-to-day data usage on the social networking service by its users).

In some embodiments, the social networking system may set one or more user-traffic thresholds. For example, the social networking system may set a floor user-traffic threshold 604. The floor user-traffic threshold 604 may be triggered when measured user traffic (e.g., data usage) is measured at a first amount of user traffic. The social networking system may increase user traffic (e.g., data usage) by providing personalized content at an increased rate. For example, at point in time A, the measured data usage 602 satisfies the floor user-traffic threshold 604. In response to the measured data usage 602 satisfying the floor user-traffic threshold 604, the social networking system may increase (616) the actual distribution rate 614 to reduce a rate of decrease of the measured data usage 602. In some embodiments, the social networking system may increase (616) the actual distribution rate 614 at a rate that is inversely related (e.g., proportional and/or weighted) to a rate of decrease associated with the measured data usage 602. In some embodiments, the social networking system may increase (616) the actual distribution rate 614 by a first increment in response to the measured data usage 602 satisfying the floor user-traffic threshold 604. In addition, in accordance with a determination that a rate of decrease of the measured data usage 602 is not reduced by a threshold amount, the social networking system may increase (616) the actual distribution rate 614 by a second increment (and so on).

In some embodiments, the social networking system may set a ceiling user-traffic threshold 606 (e.g., a maximum (or near maximum) data capacity threshold). The ceiling user-traffic threshold 606 may be triggered when user traffic is measured at a second amount of user traffic. The second amount of user traffic is greater than the first amount of user traffic. In some embodiments, the social networking system may decrease user traffic (or reduce a rate of increase) by providing personalized content at a lower rate (e.g., decrease the actual distribution rate 614). In some embodiments, the social networking system may decrease user traffic (or reduce a rate of increase) by suspending providing of the personalized content. For example, the social networking system may set the actual distribution rate 614 to zero (or approximately zero) in accordance with a determination that the measured data usage 602 satisfies the ceiling user-traffic threshold 606.

In some embodiments, the social networking system may set a ceiling buffer threshold 608. The ceiling buffer threshold 608 may be triggered when measured user traffic is measured at a third amount of user traffic. The third amount of user traffic is less than the second amount of user traffic but greater than the first amount of user traffic. The ceiling buffer threshold 608 may form a buffer from the ceiling user-traffic threshold 606. For example, the ceiling user-traffic threshold 606 may be set at, say, 95% of data usage capacity of the social networking system and the ceiling buffer threshold 608 may be set at say, 80% of data usage capacity of the social networking system. In this way, the social networking system may begin to decrease (or reduce a rate of increase) measured data usage prior to the measured data usage satisfying the ceiling user-traffic threshold 606.

For example, at point in time B, the measured data usage 602 satisfies (e.g., meets and/or exceeds) the ceiling buffer threshold 608. In response to the measured data usage 602 satisfying the ceiling buffer threshold 608, the social networking system may decrease (618) the actual distribution rate 614 to decrease (or reduce a rate of increase) the measured data usage 602. In other words, the social networking system may provide a lesser amount of personalized content to the users of the social networking service. In some embodiments, the social networking system may decrease (618) the actual distribution rate 614 at a rate that is inversely related (e.g., proportional) to a rate of increase associated with the measured data usage 602. In some embodiments, the social networking system may decrease (618) the actual distribution rate 614 by a first increment in response to the measured data usage 602 satisfying the ceiling buffer threshold 608. In addition, in accordance with a determination that a rate of increase of the measured data usage 602 is not reduced by a threshold amount, the social networking system may decrease (618) the actual distribution rate 614 by a second increment (and so on).

In some embodiments, the social networking system may modify the actual distribution rate 614 based on deviations of the measured data usage 602 from a baseline (e.g., baseline 609). The social networking system may modify the actual distribution rate 614 in real time based on the deviations of the measured data usage 602 from the baseline. In this way, the social networking system may minimize a probability of the measured data usage 602 increasing or decreasing by the first, second, and/or third amounts.

In some embodiments, the social networking system may set one or more thresholds at different levels based on region. For example, the region 300 (e.g., the United States of America) may have a greater server and/or network capacity relative to other regions in the world. Consequently, the ceiling user-traffic threshold 606 in region 300 may be greater than a ceiling user-traffic threshold 606 in another region (e.g., region 400). As such, the social networking system may set the ceiling user-traffic threshold 606 in region 300 to a first level and may set the ceiling user-traffic threshold 606 in region 400 to a second level (the first level is greater than the second level). The social networking system may set the one or more thresholds in accordance with a server and/or network capacity in the region.

FIGS. 7A-7F are flow diagrams illustrating a method of providing personalized content to users of a social networking system, in accordance with some embodiments. The steps of the method 700 may be performed by a social networking system (e.g., social networking system 108, FIG. 1; server system 200, FIG. 2). FIGS. 7A-7F correspond to instructions stored in a computer memory or computer readable storage medium (e.g., memory 206 of the server system 200). For example, the operations of method 700 are performed, at least in part, by a distribution module (e.g., distribution module 228, FIG. 2) and a traffic measuring module (e.g., traffic measuring module 236, FIG. 2).

In performing the method 700, the social networking system may determine (702) user-traffic patterns during respective periods of time for a plurality of users of a social networking service in a geographic region (e.g., sub-regions 302, 304, 306, or 308, FIG. 3). In some embodiments, the user-traffic patterns include a first user-traffic pattern (e.g., user-traffic patterns 504, 506, or 508 of user-traffic pattern

502, FIG. 5A) during a first period of time (e.g., periods of time 510, 512, or 514, FIG. 5A). In some embodiments, the respective periods of time are distinct periods of time during a day (704). In some embodiments, the respective periods of time are distinct periods of time during a predetermined hourly period (e.g., a 48-hour period). Determining user-traffic patterns is discussed in further detail above with respect to FIG. 5A.

In performing the method 700, the social networking system may select (706) a first set of users from the plurality of users in the geographic region to receive personalized content. For example, sub-region 302 in FIG. 3 may include one million users of the social networking service. The social networking system may select, say, one-hundred thousand users of the million users to receive personalized content during the first period of time (e.g., first period of time 510, FIG. 5A). In some embodiments, when selecting the first set of users, the social networking system may select (708) users from the plurality of users at random. For example, the social networking system may select the one-hundred thousand users of the million users at random. In some embodiments, when selecting the first set of users, the social networking system may select (710) users from the plurality of users with respective individual user-traffic patterns that indicate activity on the social networking service during the first period of time. For example, the social networking system may select one-hundred thousand users who are generally active (e.g., participate) on the social networking service during the first period of time (e.g., users who may be active on the social networking service between 12:00 am and 7:59 am, or more specifically, users who may be active on the social networking service between 5:00 am and 7:59 am). The personalized content may be personalized for respective users in the first set of users (e.g., a personalized video).

In some embodiments, the social networking system may set (712) a first distribution rate (e.g., the first distribution rate 534 of the planned distribution rate 532, FIG. 5B) for the personalized content during the first period of time based at least in part on the first user-traffic pattern (e.g., the first user-traffic pattern 504 of the user-traffic pattern 502, FIG. 5A). In some embodiments, when setting the first distribution rate, the social networking system may set (714) the first distribution rate to a rate, based at least in part on the first user-traffic pattern, that provides a specified likelihood (e.g., an estimate) that measured user traffic on the social networking service will not exceed a user-traffic threshold (e.g., ceiling user-traffic threshold 606 and/or ceiling buffer threshold 608, FIG. 6A) for the geographic region during the first period of time. For example, referring to FIG. 5A, the social networking system may use the first user-traffic pattern 504 to estimate user traffic during the first period of time 510 on a respective day of the year. The social networking system may set the first distribution rate 534 to create an inverse relationship between the first user-traffic pattern 504 and the first distribution rate 534 (e.g., the first distribution rate 534 increases when the first user-traffic pattern 504 decreases from peak regions 516-1 to valley region 518). In some embodiments, the inverse relationship between a respective user-traffic pattern and a respective distribution rate may be an inverse proportional relationship. In some embodiments, the relationship between a respective user-traffic pattern and a respective distribution rate may be inverse, but not proportional. Setting distribution rates is discussed in further detail above with reference to FIGS. 5A-5B.

In some embodiments, the social networking system may provide (716) the personalized content to client devices of respective users in the first set of users in accordance with the first distribution rate during the first period of time. In some embodiments, the first distribution rate is a linear distribution rate (e.g., provide X-$n$ umber of personalized videos to the first set of users per hour). In some embodiments, the first distribution rate is a non-linear (e.g., parabolic) distribution rate. For example, referring to FIG. 5B, the first sub-distribution rate 534 of the planned distribution rate 532 increases at a faster rate near the beginning of the first period of time 510 relative to a rate of increase near the end of the first period of time 510, or vice versa.

In some embodiments, the method 700 may include method 718. The steps of the method 718 may be performed in conjunction with the steps of the method 700. For example, the steps of the method 718 may be performed after (or while performing) steps 716, 786, and/or 794 of the method 700.

In some embodiments, while providing the personalized content during the first period of time (e.g., the first period of time 510, FIG. 5A) in the geographic region, the social networking system may measure (720) user traffic (e.g., measured data usage 602, FIG. 6A) on the social networking service in the geographic region. For example, the social networking system may determine data usage by users (e.g., the first set of users) on the social networking service in real time. In addition, in some embodiments, the social networking system may measure data usage resulting from users receiving (e.g., consuming) personalized content from the social networking system. In some embodiments, in accordance with a determination that the measured user traffic does not satisfy a first user-traffic threshold (722—No), the social networking system may continue (724) providing the personalized content in accordance with the first distribution rate. For example, prior to point in time A (FIG. 6A), the measured data usage 602 does not satisfy any of the thresholds (thresholds 604, 606, and 608). Consequently, the actual distribution rate 614 substantially follows the planned distribution rate 612 prior to the point in time A. In some embodiments, the first user-traffic threshold is an example of the ceiling buffer threshold 608 (FIG. 6A).

In some embodiments, in accordance with a determination that the measured user traffic satisfies the first user-traffic threshold (722—Yes), the social networking system may reduce (726) the first distribution rate. For example, at point in time B, the measured data usage 602 meets and/or exceeds (e.g., satisfies) the ceiling buffer threshold 608 (FIG. 6A). Referring to FIG. 6B, in response to the measured data usage 602 meeting and/or exceeding the ceiling buffer threshold 608, the social networking system may reduce (618) the actual distribution rate. In this way, the social networking system may minimize a risk of the server and/or network capacity being reached while providing the personalized content.

In some embodiments, while providing the personalized content during the first period of time in the geographic region in accordance with the reduced distribution rate (e.g., reduced rate 618 from the planned distribution rate 612, FIG. 6B), the social networking system may measure user traffic on the social networking service in the geographic region. For example, the measured data usage 602 includes data usage (e.g., user traffic) after point in time B (FIG. 6A). In some embodiments, in accordance with a determination that the measured user traffic does not satisfy a second user-traffic threshold (728—No), the social networking system may continue (730) providing the personalized content in accordance with the reduced first distribution rate. For example, the measured data usage 602 does not meet and/or exceed the ceiling user-traffic threshold 606 after the point in time B (FIG. 6A). In some embodiments, the second user-traffic threshold is an example of the ceiling user-traffic threshold 606 (FIG. 6A). In some embodiments, the second user-traffic threshold marks a maximum (or a maximum with a safety factor) data capacity of the social networking system. In some embodiments, the second user-traffic threshold is greater than the first user-traffic threshold.

Alternatively, in some embodiments, in accordance with a determination that the measured user traffic does not satisfy the second user-traffic threshold (728—No), the social networking system may increase the reduced first distribution rate (e.g., increased rate 620, FIG. 6B). For example, the social networking system may increase the reduced first distribution rate to the first distribution rate. In some embodiments, the social networking system may increase the reduced first distribution rate in accordance with a determination that the first user-traffic threshold is no longer satisfied. In another example, the social networking system may increase the reduced first distribution rate to a rate between the reduced first distribution rate and the first distribution rate (e.g., the social networking system may distribute personalized content in accordance with the measured data usage 602, FIG. 6A).

In some embodiments, in accordance with a determination that the measured user traffic satisfies the second user-traffic threshold (728—Yes), the social networking system may suspend (732) providing of the personalized content. For example, although not shown in FIGS. 6A-6B, the social networking system may set the actual distribution rate 614 to zero (or approximately zero) in accordance with a determination that the measured data usage 602 meets and/or exceeds the ceiling user-traffic threshold 606.

In some embodiments, the method 700 may include method 734. The steps of the method 734 may be performed in conjunction with the steps of the method 700. For example, the steps of the method 734 may be performed after (or while performing) steps 716, 786, and/or 794 of the method 700.

In some embodiments, while providing the personalized content during the first period of time in the geographic region, the social networking system may measure (736) user traffic on the social networking service in the geographic region. In some embodiments, in accordance with a determination that the measured user traffic does not satisfy a traffic threshold (738—No), the social networking system may continue (740) providing the personalized content in accordance with the first distribution rate. In some embodiments, the traffic threshold is an example of the ceiling user-traffic threshold 606 (FIG. 6A).

In some embodiments, in accordance with a determination that the measured user traffic satisfies the traffic threshold (738—Yes), the social networking system may suspend (742) providing of the personalized content. For example, although not shown in FIGS. 6A-6B, the measured data usage 602 may meet and/or exceed (e.g., satisfy) the ceiling user-traffic threshold 606 at a point in time during the first period of time. In some embodiments, after suspending providing of the personalized content and in accordance with a determination that the measured user traffic continues to satisfy the traffic threshold (744—Yes), the social networking system may continue to suspend (746) providing of the personalized content.

In some embodiments, after suspending providing of the personalized content and in accordance with a determination that the measured user traffic no longer satisfies the traffic threshold (744—No), the social networking system may resume (748) providing of the personalized content. In some embodiments, the first distribution rate is lower after resuming providing of the personalized content than before suspending providing of the personalized content (750). In this way, the social networking system may minimize a risk of measured user traffic spiking during the first period of time. In some embodiments, the social networking system may ramp up (752) the first distribution rate after resuming providing of the personalized content, in accordance with the measured user traffic. The social networking system may resume providing of the personalized content using a second distribution rate (e.g., a reduced first distribution rate) and may increase (e.g., linearly or non-linearly) the second distribution rate to the first distribution rate in accordance with the measured user traffic.

In some embodiments, the method 700 may include method 754. The steps of the method 754 may be performed in conjunction with the steps of the method 700. For example, the steps of the method 754 may be performed after (or while performing) steps 716, 786, and/or 794 of the method 700.

In some embodiments, while providing the personalized content during the first period of time (e.g., first period of time 510, FIG. 5A) in the geographic region, the social networking system may measure (756) user traffic (e.g., measured data usage 602, FIG. 6A) on the social networking service in the geographic region. In some embodiments, in accordance with a determination that the measured user traffic does not satisfy a user-traffic threshold (758—No), the social networking system may increase the first distribution rate. In some embodiments, the user-traffic threshold is an example of the floor user-traffic threshold 604 (FIG. 6A). For example, at point in time A, the measured data usage 602 meets and/or exceeds the floor user-traffic threshold 604 (FIG. 6A). In response to the measured data usage 602 meeting and/or exceeding the floor user-traffic threshold 604, the social networking system may increase (616) the actual distribution rate 614. In this way, the social networking system may maintain an amount (e.g., a critical mass) of personalized content on the social networking service (e.g., maintain user's interest in the personalized content being distributed to the first set of users).

In some embodiments, the social networking system may increase the first distribution rate by a first increment. In some embodiments, the social networking system may increase the first distribution rate in accordance with the measured user traffic. For example, the increase (614) may be inversely related (e.g., proportional) to a rate of decrease of the measured data usage 602 at the point in time A. Increasing (or decreasing) the distribution rate is discussed in further detail above with reference to FIGS. 6A-6B.

In some embodiments, in accordance with a determination that the measured user traffic continues to not satisfy the user-traffic threshold, the social networking system may further increase the first distribution rate. In some embodiments, the social networking system may increase the first distribution rate by a second increment. In some embodiments, the social networking system may increase the first distribution rate not in accordance with the measured user traffic. For example, the social networking system may increase the first distribution rate to a second distribution rate and/or maximum distribution rate (e.g., distribute the personalized content to the respective users of the first set of users and/or distribute the personalized content to respective users of a second set of users of the plurality of users).

In some embodiments, in accordance with a determination that the measured user traffic satisfies the user-traffic threshold (758—Yes), the social networking system may continue (762) providing the personalized content in accordance with the first distribution rate. For example, the actual distribution rate 614 substantially follows the planned distribution rate 612 prior to the point in time A (FIG. 6B).

In some embodiments, the method 700 may include method 764. The steps of the method 764 may be performed in conjunction with the steps of the method 700. For example, the steps of the method 764 may be performed after (or while performing) steps 716, 786, and/or 794 of the method 700.

In some embodiments, while providing the personalized content during the first period of time in the geographic region, the social networking system may track (766) posting of the personalized content to the social networking service by the first set of users. In some embodiments, in accordance with a determination that a ratio between the posted personalized content and the provided personalized content does not satisfy a threshold (768—No), the social networking system may continue (770) providing the personalized content in accordance with the first distribution rate.

In some embodiments, in accordance with a determination that the ratio between the posted personalized content and the provided personalized content satisfies the threshold (768—Yes), the social networking system may reduce (772) the first distribution rate. For example, respective users of the first set of user may receive personalize content from the social networking system. However, the respective users may delay in posting and/or otherwise sharing the received content to the social networking service. In these circumstances, a backlog of personalized content may exist. As such, the backlog may create data usage issues if the backlog is posted/shared by the respective users at a later point in time. For example, posting/sharing of the personalized content may cause the measured data usage 602 to spike resulting in the measured data usage 602 meeting and/or exceeding the ceiling user-traffic threshold 606. In some embodiments, the social networking system may reduce the first distribution rate by a predetermined increment to reduce a likelihood of a backlog being formed. In some embodiments, the social networking system may reduce the first distribution rate in accordance with the measured user traffic to reduce a likelihood of a backlog being formed. Increasing (or decreasing) the distribution rate is discussed in further detail above with reference to FIGS. 6A-6B.

In some embodiments, the method 700 may include method 774. The steps of the method 774 may be performed in conjunction with the steps of the method 700. For example, the steps of the method 774 may be performed after (or while performing) steps 716, 786, and/or 794 of the method 700.

In some embodiments, while providing the personalized content during the first period of time in the geographic region, the social networking system may provide (776), to a portion of users who view the personalized content of a first user of the first set of users and who are not in the first set of users, an affordance for requesting personalized content. For example, the affordance may be displayed with the personalized content provided to the first user (e.g., a button stating "Want your own video?"). In another example, the social networking system may provide respective notifications to users of the portion of users and the respective notifications may include the affordance for requesting personalized content. In some embodiments, the portion of users is contacts (i.e., friends) of the first user on the social networking service.

In some embodiments, the social networking system may receive (778), from a client device of a user of the portion of users, an indication of selection of the affordance. In response to receiving the indication of selection of the affordance, the social networking system may provide personalized content to the client device during the first period of time. In some embodiments, the social networking system may provide the personalized content to the client device during a second period of time (e.g., second period of time 512, FIG. 5A). The social networking system may wait to provide the personalized content to the client device depending on an amount of measured user traffic (e.g., measured data usage 602, FIG. 6A) when the social networking system received the indication of selection. For example, referring to FIG. 6A, if the social networking system receives the indication of selection at point in time B, then the social networking service may wait (e.g., wait until measured user traffic drops below the ceiling buffer threshold 608) to provide the personalized content to the client device. In some embodiments, the social networking system may receive a plurality of indications of selection from respective client devices of multiple users of the portions of users.

Figure 7A:
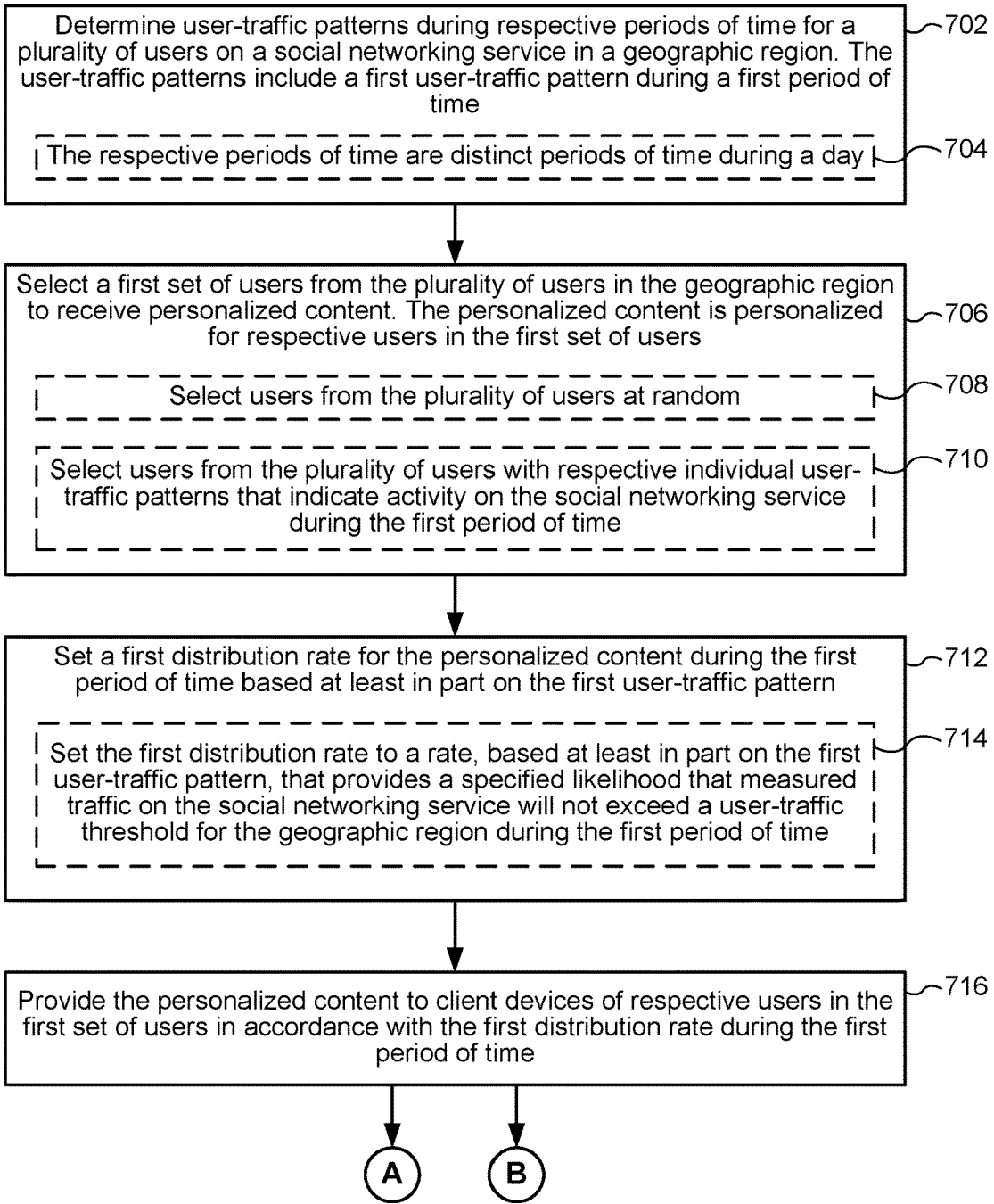
FIGS. 7A-7F are flow diagrams illustrating a method of providing personalized content to users of a social networking system, in accordance with some embodiments.
Figure 7B:
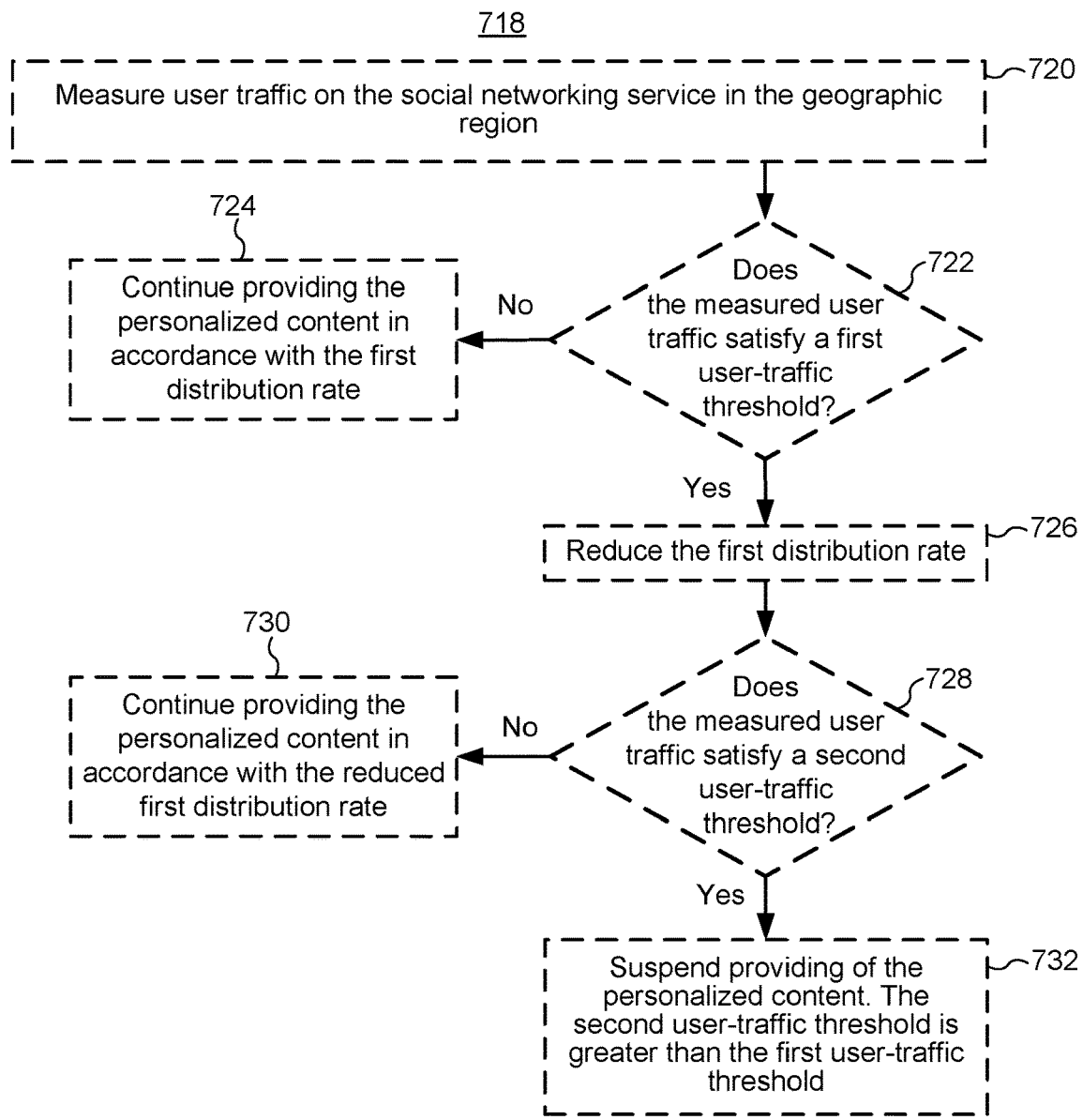
Figure 7C:
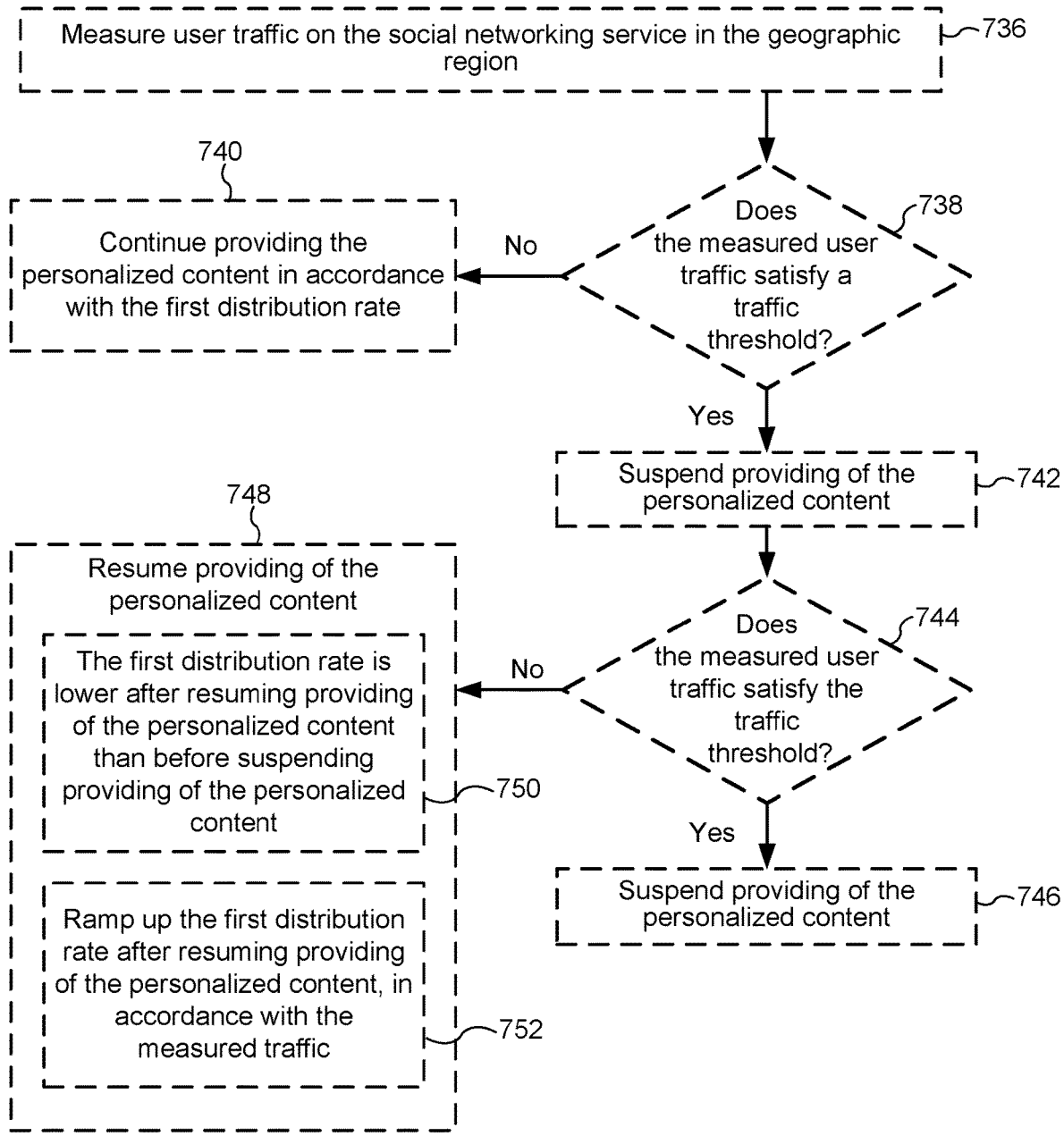
Figure 7D:
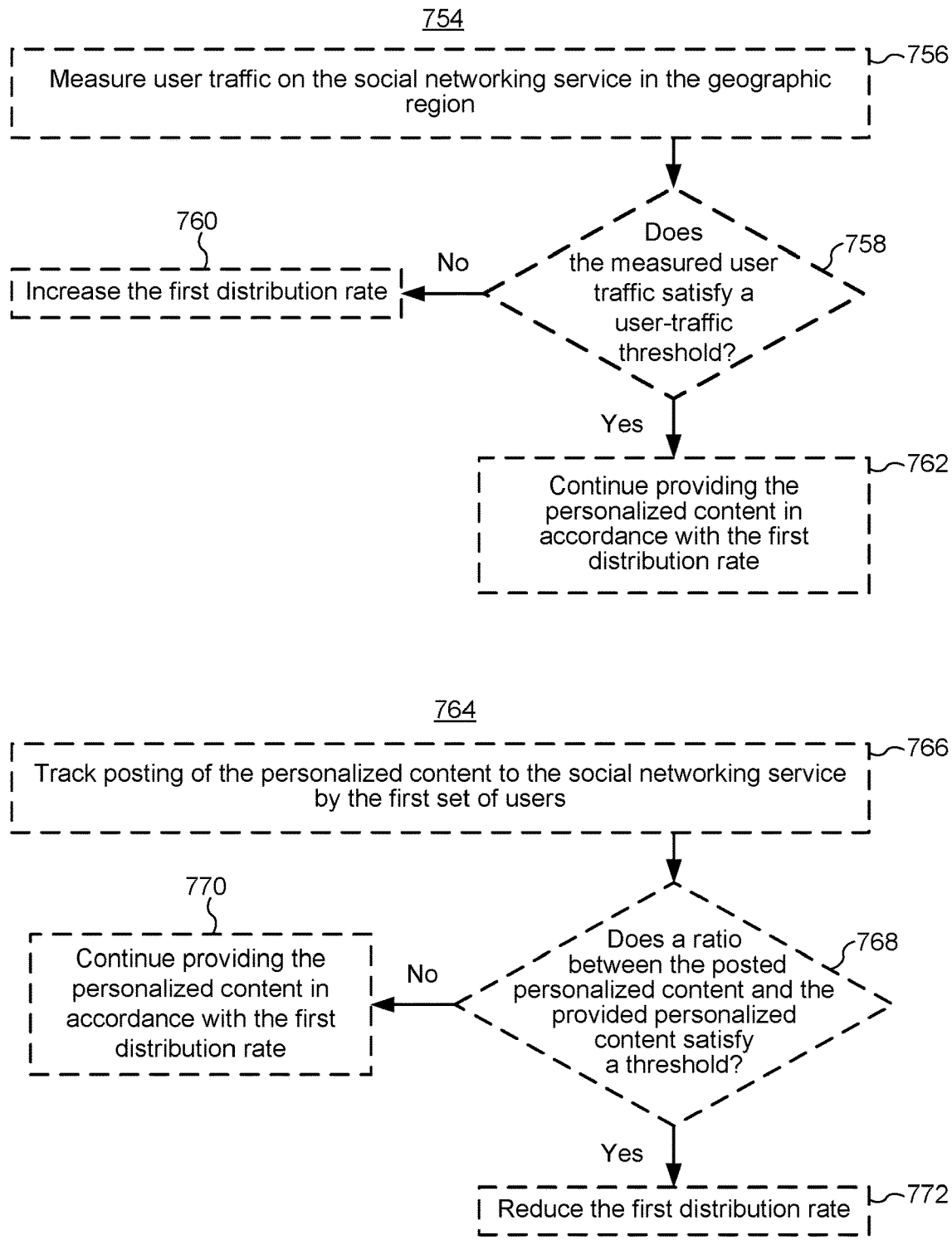
Figure 7E:
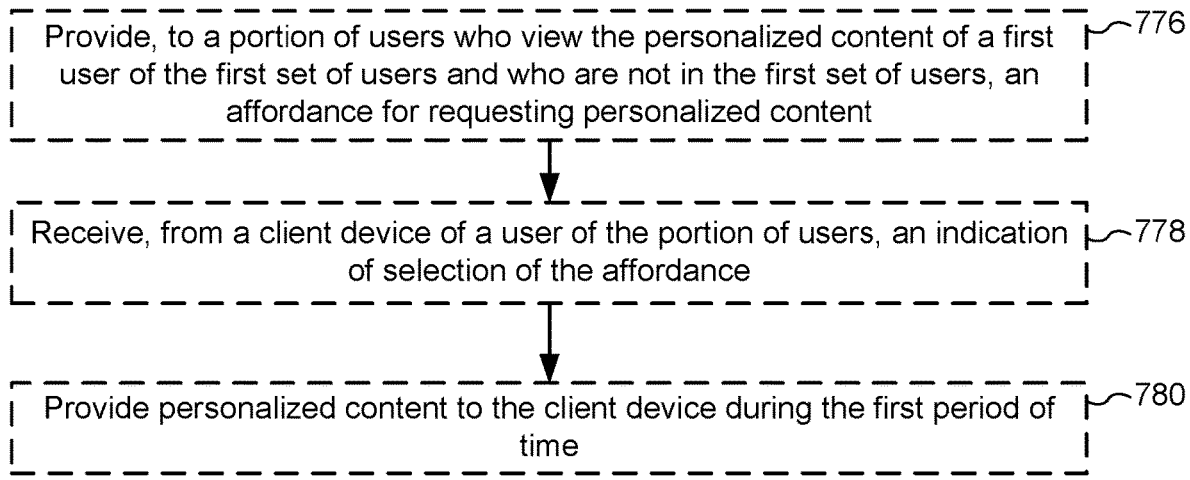
Figure 7E:
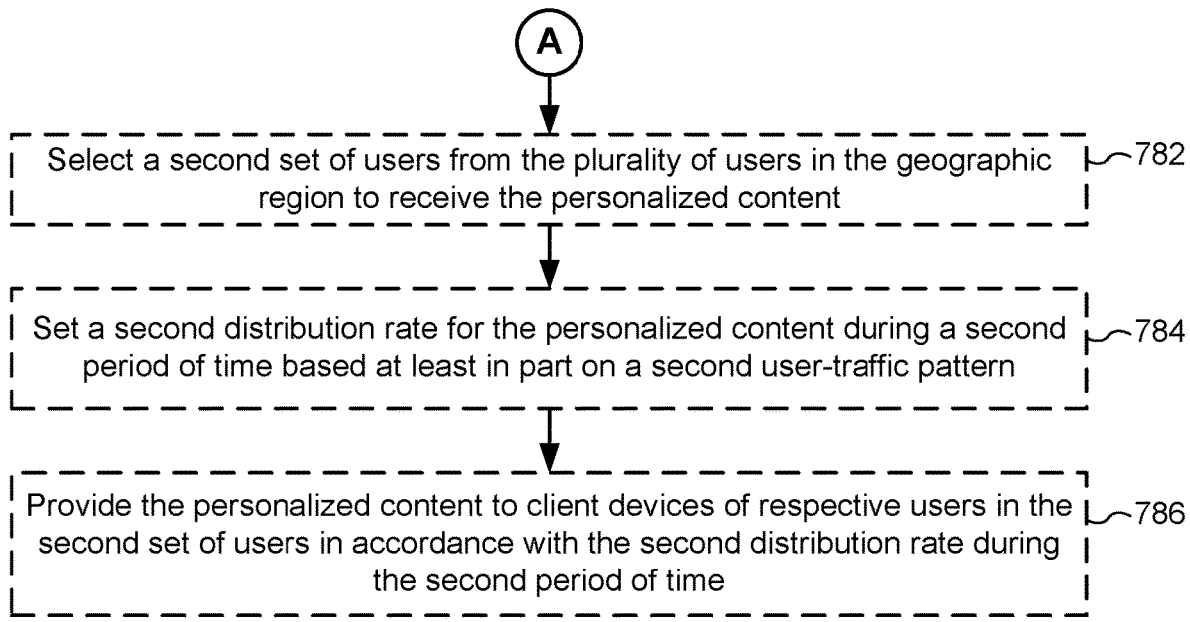
Figure 7F:
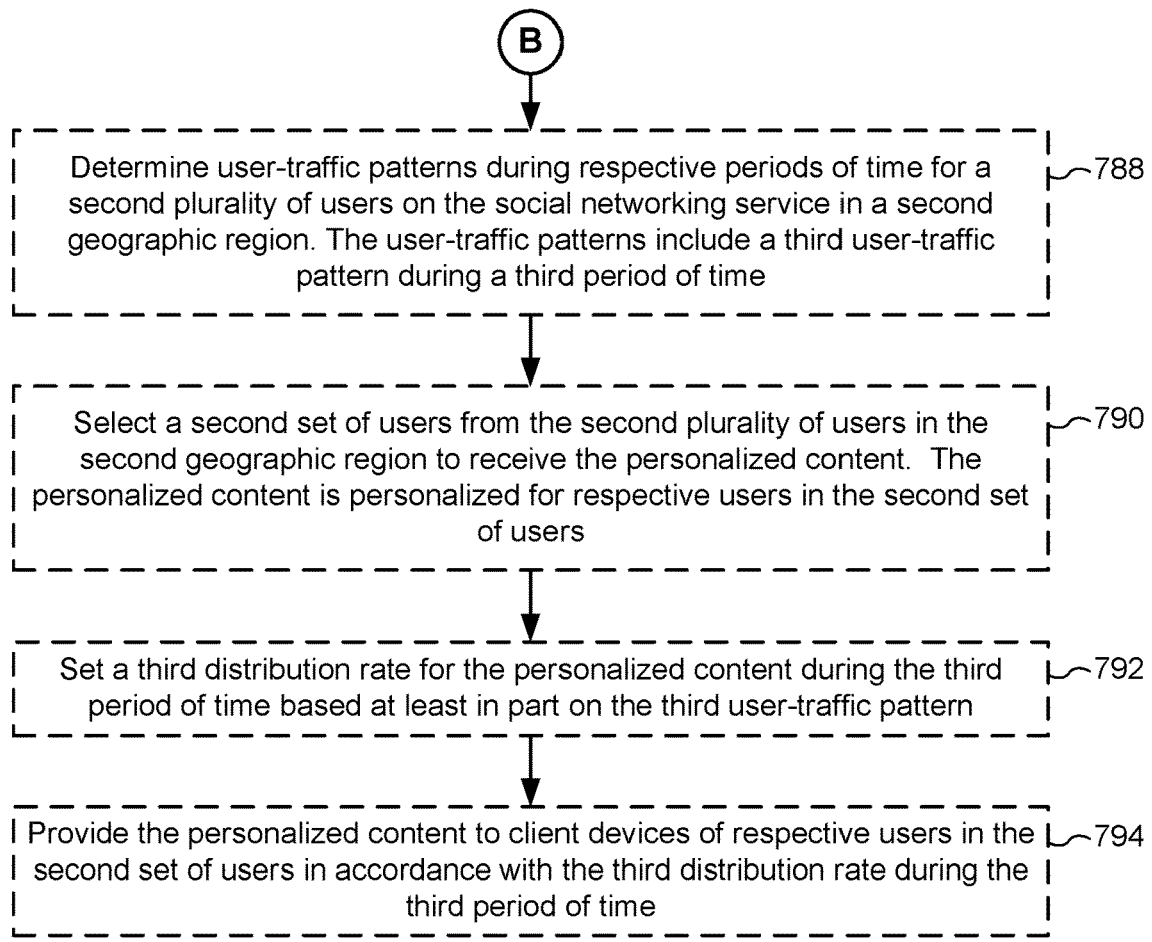

In some embodiments, the social networking system may select (782) a second set of users from the plurality of users in the geographic region to receive the personalized content. For example, sub-region 302 in FIG. 3 may include a million users of the social networking service. The social networking system may select, say, a second one-hundred thousand of the million users to receive personalized content during a second period of time (e.g., second period of time 512, FIG. 5A). In some embodiments, the social networking system may select a third set of users from the plurality of users in the geographic region to receive the personalized content, and so on. Selecting a set of users is discussed in further detail above with reference to steps 706, 708, and 710 (FIG. 7A).

In some embodiments, the social networking system may set (784) a second distribution rate (e.g., second distribution rate 536 of the planned distribution rate 532, FIG. 5B) for the personalized content during a second period of time (e.g., the second period of time 512, FIG. 5A) based at least in part on a second user-traffic pattern (e.g., the second user-traffic pattern 506, FIG. 5A). Setting distribution rates is discussed in further detail above with reference to steps 712 and 714 (FIG. 7A).

In some embodiments, the social networking system may provide (786) the personalized content to client devices of respective users in the second set of users in accordance with the second distribution rate during the second period of time. Providing the personalized content (e.g., personalized videos) to respective users of a set of users is discussed in further detail above with reference to step 716 (FIG. 7A).

In some embodiments, the social networking system may determine (788) user-traffic patterns during respective periods of time for a second plurality of users on the social networking service in a second geographic region. In some embodiments, the second geographic region is another sub-region within the same region. For example, the second geographic region may be the sub-region 304 (FIG. 3) or sub-region 404 (FIG. 4). In some embodiments, the second geographic region is a sub-region in a new overarching geographic region. For example, the first geographic region may be a sub-region in the United States (e.g., sub-region 302 of region 300, FIG. 3) and the second geographic region may be a sub-region in Africa (e.g., sub-region 402 of region 400, FIG. 4). In some embodiments, the user-traffic patterns may include a third user-traffic pattern during a third period of time. Determining user-traffic patterns is discussed in further detail above with reference to step 702 (FIG. 7A).

In some embodiments, the social networking system may select (790) a set of users from the second plurality of users in the second geographic region to receive the personalized content. The personalized content is personalized for respective users in the second set of users. Selecting a set of users is discussed in further detail above with reference to steps 706, 708, and 710 (FIG. 7A).

In some embodiments, the social networking system may set (792) a third distribution rate for the personalized content during the third period of time based at least in part on the third user-traffic pattern. Setting distribution rates is discussed in further detail above with reference to steps 712 and 714 (FIG. 7A).

In some embodiments, the social networking system may set provide (794) the personalized content to client devices of respective users in the second set of users in accordance with the third distribution rate during the third period of time. Providing the personalized content to respective users is discussed in further detail above with reference to step 716 (FIG. 7A).

Although some of various drawings illustrate a number of logical stages in a particular order, stages which are not order dependent may be reordered and other stages may be combined or broken out. While some reordering or other groupings are specifically mentioned, others will be obvious to those of ordinary skill in the art, so the ordering and groupings presented herein are not an exhaustive list of alternatives. Moreover, it should be recognized that the stages could be implemented in hardware, firmware, software or any combination thereof.

The foregoing description, for purpose of explanation, has been described with reference to specific embodiments. However, the illustrative discussions above are not intended to be exhaustive or to limit the scope of the claims to the precise forms disclosed. Many modifications and variations are possible in view of the above teachings. The embodiments were chosen in order to best explain the principles underlying the claims and their practical applications, to thereby enable others skilled in the art to best use the embodiments with various modifications as are suited to the particular uses contemplated.

What is claimed is:

1. A method, comprising:
at a server system having one or more processors and memory storing instructions for execution by the one or more processors:
determining aggregate user-traffic patterns during respective periods of time for a plurality of users on a social networking service in a geographic region, the aggregate user-traffic patterns including a first user-traffic pattern during a first period of time, wherein each aggregate user-traffic pattern comprises aggregated social networking participating activity, within the social networking service, for the plurality of users on the social networking service;
selecting a first set of users from the plurality of users in the geographic region to receive personalized content, wherein the personalized content is personalized for respective users in the first set of users;
setting a first distribution rate for the personalized content during the first period of time based at least in part on the first user-traffic pattern, including
determining a number of copies of the personalized content to be distributed during the first period of time; and
providing the personalized content to client devices of respective users in the first set of users in accordance with the first distribution rate during the first period of time.

2. The method of claim 1, wherein selecting the first set of users comprises selecting users from the plurality of users at random.

3. The method of claim 1, wherein selecting the first set of users comprises selecting users from the plurality of users with respective individual user-traffic patterns that indicate activity on the social networking service during the first period of time.

4. The method of claim 1, wherein setting the first distribution rate comprises:
setting the first distribution rate to a rate, based at least in part on the first user-traffic pattern, that provides a specified likelihood that measured user traffic on the social networking service will not exceed a user-traffic threshold for the geographic region during the first period of time.

5. The method of claim 1, further comprising, at the server system, while providing the personalized content during the first period of time in the geographic region:
measuring user traffic on the social networking service in the geographic region; and
in accordance with a determination that the measured user traffic satisfies a first user-traffic threshold, reducing the first distribution rate.

6. The method of claim 5, further comprising, at the server system, while providing the personalized content during the first period of time in the geographic region:
in accordance with a determination that the measured user traffic satisfies a second user-traffic threshold, suspending providing of the personalized content;
wherein the second user-traffic threshold is greater than the first user-traffic threshold.

7. The method of claim 1, further comprising, at the server system, while providing the personalized content during the first period of time in the geographic region:
measuring user traffic on the social networking service in the geographic region; and
in accordance with a determination that the measured user traffic satisfies a traffic threshold, suspending providing of the personalized content.

8. The method of claim 7, further comprising, at the server system, in accordance with a determination that the measured user traffic no longer satisfies the traffic threshold, resuming providing of the personalized content.

9. The method of claim 8, wherein the first distribution rate is lower after resuming providing of the personalized content than before suspending providing of the personalized content.

10. The method of claim 9, further comprising ramping up the first distribution rate after resuming providing of the personalized content, in accordance with the measured user traffic.

11. The method of claim 1, further comprising, at the server system, while providing the personalized content during the first period of time in the geographic region:
measuring user traffic on the social networking service in the geographic region; and
in accordance with a determination that the measured user traffic does not satisfy a user-traffic threshold, increasing the first distribution rate.

12. The method of claim 1, further comprising, at the server system, while providing the personalized content during the first period of time in the geographic region:
    providing, to a portion of users who view the personalized content of a first user of the first set of users and who are not in the first set of users, an affordance for requesting personalized content;
    receiving, from a client device of a user of the portion of users, an indication of selection of the affordance; and
    in response to receiving the indication of selection of the affordance, providing personalized content to the client device during the first period of time.

13. The method of claim 1, wherein the aggregate user-traffic patterns include a second user-traffic pattern during a second period of time in the geographic region and the method further comprises, at the server system:
    selecting a second set of users from the plurality of users in the geographic region to receive the personalized content;
    setting a second distribution rate for the personalized content during the second period of time based at least in part on the second user-traffic pattern; and
    providing the personalized content to client devices of respective users in the second set of users in accordance with the second distribution rate during the second period of time.

14. The method of claim 1, further comprising, at the server system, while providing the personalized content during the first period of time in the geographic region:
    tracking posting of the personalized content to the social networking service by the first set of users; and
    in accordance with a determination that a ratio between a number of times the personalized content is posted and a number of times the personalized content is provided satisfies a threshold, reducing the first distribution rate.

15. The method of claim 1, wherein the plurality of users is a first plurality of users, the geographic region is a first geographic region, and the method further comprises, at the server system:
    determining aggregate user-traffic patterns during respective periods of time for a second plurality of users on the social networking service in a second geographic region, the aggregate user-traffic patterns including a third user-traffic pattern during a third period of time;
    selecting a second set of users from the second plurality of users in the second geographic region to receive the personalized content, wherein the personalized content is personalized for respective users in the second set of users;
    setting a third distribution rate for the personalized content during the third period of time based at least in part on the third user-traffic pattern; and
    providing the personalized content to client devices of respective users in the second set of users in accordance with the third distribution rate during the third period of time.

16. A server system, comprising:
    a processor; and
    memory storing one or more programs for execution by the processor, the one or more programs including instructions for:
        determining aggregate user-traffic patterns during respective periods of time for a plurality of users on a social networking service in a geographic region, the aggregate user-traffic patterns including a first user-traffic pattern during a first period of time, wherein each aggregate user-traffic pattern comprises aggregated social networking participating activity, within the social networking service, for the plurality of users on the social networking service;
        selecting a first set of users from the plurality of users in the geographic region to receive personalized content, wherein the personalized content is personalized for respective users in the first set of users;
        setting a first distribution rate for the personalized content during the first period of time based at least in part on the first user-traffic pattern, including determining a number of copies of the personalized content to be distributed during the first period of time; and
        providing the personalized content to client devices of respective users in the first set of users in accordance with the first distribution rate during the first period of time.

17. The system of claim 16, wherein selecting the first set of users comprises selecting users from the plurality of users with respective individual user-traffic patterns that indicate activity on the social networking service during the first period of time.

18. The system of claim 16, wherein setting the first distribution rate comprises:
    setting the first distribution rate to a rate, based at least in part on the first user-traffic pattern, that provides a specified likelihood that measured user traffic on the social networking service will not exceed a user-traffic threshold for the geographic region during the first period of time.

19. A non-transitory computer-readable storage medium, storing one or more programs configured for execution by one or more processors of a server system, the one or more programs including instructions, which when executed by the one or more processors cause the server system to:
    determine aggregate user-traffic patterns during respective periods of time for a plurality of users on a social networking service in a geographic region, the aggregate user-traffic patterns including a first user-traffic pattern during a first period of time, wherein each aggregate user-traffic pattern comprises aggregated social networking participating activity, within the social networking service, for the plurality of users on the social networking service;
    select a first set of users from the plurality of users in the geographic region to receive personalized content, wherein the personalized content is personalized for respective users in the first set of users;
    set a first distribution rate for the personalized content during the first period of time based at least in part on the first user-traffic pattern, including determine a number of copies of the personalized content to be distributed during the first period of time; and
    provide the personalized content to client devices of respective users in the first set of users in accordance with the first distribution rate during the first period of time.

20. The method of claim 1, wherein the first user-traffic pattern comprises data usage due to user activity on the social networking service.

* * * * *